US 6,526,215 B2

(12) United States Patent
Hirai et al.

(10) Patent No.: US 6,526,215 B2
(45) Date of Patent: *Feb. 25, 2003

(54) APPARATUS FOR EDITING MOVING PICTURE HAVING A RELATED INFORMATION THEREOF, A METHOD OF THE SAME AND RECORDING MEDIUM FOR STORING PROCEDURES IN THE SAME METHOD

(75) Inventors: Seiichi Hirai, Koshigaya (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/188,692

(22) Filed: Nov. 10, 1998

(65) Prior Publication Data

US 2002/0131760 A1 Sep. 19, 2002

(30) Foreign Application Priority Data

Nov. 11, 1997 (JP) .............................. 9-308936
Apr. 3, 1998 (JP) ........................... 10-091975

(51) Int. Cl.$^7$ .............................. H04N 5/93; G09G 5/00
(52) U.S. Cl. ......................................... 386/52; 345/723
(58) Field of Search ................................ 386/4, 45–46, 386/52, 64, 69–70, 125–126; 348/700–701; 345/723–726

(56) References Cited

U.S. PATENT DOCUMENTS

| 5,537,528 | A | | 7/1996 | Takahashi et al. | |
| 5,956,026 | A | * | 9/1999 | Ratakonda | 345/328 |
| 5,956,453 | A | * | 9/1999 | Yaegashi et al. | 386/52 |
| 5,995,095 | A | * | 11/1999 | Ratakonda | 345/328 |
| 6,154,601 | A | * | 11/2000 | Yaegashi et al. | 386/52 |
| 6,173,317 | B1 | * | 1/2001 | Chaddha et al. | 709/219 |
| 6,192,183 | B1 | * | 2/2001 | Taniguchi et al. | 386/52 |
| 6,195,497 | B1 | * | 2/2001 | Nagasaka et al. | 386/46 |
| 6,243,662 | B1 | * | 6/2001 | Hashimoto | 702/187 |
| 6,272,279 | B1 | * | 8/2001 | Yokoyama et al. | 386/52 |
| 6,278,497 | B1 | * | 8/2001 | Sumiyoshi et al. | 348/722 |

FOREIGN PATENT DOCUMENTS

EP 774756 5/1997
WO 9739411 10/1997

OTHER PUBLICATIONS

H. Ueda, et al, "Automatic Scene Separation and Tree Structure GUI for Video Editing" Proceedings of ACM Multimedia 96., Boston, Nov. 18–22, 1996, pp. 405–406.

* cited by examiner

Primary Examiner—Thai Tran
Assistant Examiner—Polin Chieu
(74) Attorney, Agent, or Firm—Antonelli, Terry, Stout & Kraus, LLP

(57) ABSTRACT

An apparatus for editing a moving picture having related information including an input unit for inputting said moving picture and the related information, a detecting unit for detecting change points of the moving picture and dividing the moving picture into scenes and cuts, a selecting unit for extracting a still image representing each of the scenes and cuts, a memory for storing the related information and the representative still images of the scenes and cuts, apparatus for designating representative still images of the scenes and cuts to edit the moving picture, apparatus for determining a hierarchical structure, the hierarchical structure including layers in accordance with the scenes and cuts, a display for displaying the hierarchical structure and the related information, and a controller for controlling the memory and the display.

33 Claims, 30 Drawing Sheets

FIG. 5

| | Name | Comment | Label 1 |
|---|---|---|---|
| 501-1 | Circus audio<br>Movie<br>Duration : 0 : 21 : 07 | [1] | |
| 501-2 | Flying Rings. title<br>Still Image<br>Duration : 0 : 00 : 01 : 00 | [1] Superimpose over hands | |
| 501-3 | Inrerview<br>Movie<br>Duration : 0 : 00 : 02 : 02 | [1] Use audio with rehearsal clips | First interview |
| 501-4 | *Rehearsal Clips*<br>Folder<br>3 items | [1] | |
| 501-5 | Splits<br>Movie<br>Duration : 0 : 00 : 02 : 23 | [1] Cut before she swings back<br>0 : 00 : 02 : 07 | Splits (1) near intro |

501 / 502 / 503 / 504

APPARATUS FOR EDITING MOVING PICTURE HAVING A RELATED INFORMATION THEREOF, A METHOD OF THE SAME AND RECORDING MEDIUM FOR STORING PROCEDURES IN THE SAME METHOD

BACKGROUND OF THE INVENTION

The present invention relates to a moving picture editing apparatus for use in production of such a moving picture program as television broadcasting program or video program.

The performance of a facility for television broadcasting programs or video programs has conventionally been advanced rapidly with the help of computer. In these years, in particular, remarkable advancement is directed not to a video editing method of a video tape recorder based on repeating fast-forward and fast-reverse depending on a tape counter, but to a moving picture editing apparatus for storing source material video pictures in an inexpensive hard disk which is easy to handle and save for editing of source material video pictures, that is, to a so-called nonlinear editing apparatus.

FIG. 2 shows a block diagram of a nonlinear moving picture editing apparatus.

The illustrated apparatus includes a scene change point detector 201, a magnetic memory device 202, a monitor 203, a frame buffer 204, a main memory 205, an input device 206, a video tape recorder (VTR) 207, a video interface 208, a picture compressor 209, an audio interface 210, a central processing unit (CPU) 211, a bus 212 and a picture size reducer 214.

The scene change point detector 201, magnetic memory device 202, monitor 203, frame buffer 204, main memory 205, input device 206, VTR 207, audio interface 210, picture compressor 209 and picture size reducer 214 are connected to the CPU 211 through the bus 212. The VTR 207 is connected to the video interface 208 and audio interface 210.

In FIG. 2, the CPU 211 performs data transfer with the respective constituent elements connected thereto via the bus 212, the constituent elements being controlled by an access signal received from the CPU 211. An instruction to the CPU 211 is carried out by an operator with use of the input device 206 such as a mouse or keyboard. The VTR 207 reproduces a series of moving picture information containing plurality of scenes, sends moving picture in the reproduced information to the video interface 208, and also sends an audio signal in the reproduced information to the audio interface 210. The audio interface 210 converts the received audio signal to a digital signal and sends the digital signal to the magnetic memory device 202. The magnetic memory device 202 stores therein the received audio information. The video interface 208 converts the received moving picture information to information having a format processable by the moving picture editing apparatus, and sends the converted information to the scene change point detector 201, magnetic memory device 202, main memory 205, picture compressor 209 and picture size reducer 214. The picture compressor 209 compresses digital data of the reproduced moving pictures, e.g., based on a moving picture experts group (MPEG) or motion joint photographic experts group (motion JPEG) system. The magnetic memory device 202 stores therein the received video information. The scene change point detector 201 analyzes the received moving pictures on a frame basis and detects a scene change point and a cut change point on the basis of a degree of change in a color distribution between frames. The picture size reducer 214 generates a reduced moving picture (M-icon) by thinning out data of each frame into video or moving picture data of 80×60 pixels on the basis of an analysis result of the scene change point detector 201. The generated M-icon is sent to the magnetic memory device 202 and stored therein. Moving picture analysis information (including frame numbers for scene change points or cut change points) indicative of a relationship between the M-icon and the detection result of the scene change point detector 201 is also sent to the magnetic memory 202 and saved therein. The monitor 203 displays the moving pictures stored in the magnetic memory device 202 on the basis of analysis information thereof to offer a graphical user interface (GUI) to the operator. The frame buffer 204 stores therein pictures to be displayed on the monitor 203. The main memory 205 stores therein various sorts of control programs for the CPU 211.

In this connection, the magnetic memory device 202 may be replaced by another recording medium such as a magneto-optical memory or a remote file connected through a network. Further, the mouse used as the input device 206 may be replaced by a track ball or another pointing device. A communication device 215 may be a Ether Net, an interface, asynchronous transfer mode (ATM) interface, a modem, a facsimile machine, a telephone or another communication terminal which can perform information transfer between an external communication network and the nonlinear editing apparatus.

The operator sequentially edits the reduced moving picture (M-icon) on which the scene analysis information obtained at the scene change point detector 201 is reflected, and constructs them into a tree structure.

FIG. 3 shows an example of the editing display screen displayed on the monitor 203. In the drawing, reference numeral 301 denotes a hierarchical structure (a tree structure) area, numeral 302 denotes an M-icon, 303 denotes a schematic enlargement of the M-icon, 304 denotes a source material area, and 305 denotes a group of various function buttons. Editing is carried out by constructing M-icons into such a hierarchical structure as shown in the hierarchical structure area 301 of an editing screen 300. In the tree (in the hierarchical structure area 301), M-icons (for example M-icon 302) of a lowest layer are cuts which are composed a plurality of frame images, M-icons of a upper layer of said lowest layer are scenes which are composed a plurality of cuts, and a M-icon of a uppermost layer are moving pictures which are composed a plurality of scenes. Namely, in the tree having a plurality of layers, an M-icon is in upper layer represents a combination of M-icons in a lower layer belonging to the upper layer, which corresponds to a chapter or section in a story. An M-icon in the uppermost layer represents the story. The source material area 304 is an area in which the M-icons 302 prepared by the picture size reducer 214 based on an analysis result of the scene change point detector 201 are arranged. The operator selects ones of the icons to be edited and constructs them into a hierarchical structure in the hierarchical structure area 301. The various function buttons 305 are operating buttons for various sorts of editing operations on the editing screen 300.

Such an apparatus as mentioned above can lighten operator's burden.

More in detail, since editing can be realized on a scene or cut (or clip) basis, story making can be facilitated. Further, since division of the input moving pictures into cut units can be automatically carried out, operator's inconvenience of manually doing so can be eliminated. In addition, since the moving pictures can be stored and managed in the form of a hierarchical structure, retrieval of a necessary scene or cut (or clip) can be facilitated.

Explanation will next be made by referring to FIGS. 4 and 5 as to a specific example (information managing/displaying method) of a method for managing related video information (linked video information) in the prior art nonlinear editing apparatus. FIGS. 4 and 5 show related video linked information such as source material names, types and lengths of source material media, and comments. Reference numeral 401 denotes a column for indication of different sorts of source material icons, reference symbol 401-1 and 401-2 denote source icons, numeral 402 denotes a column for indication of names of the source materials, 403 denotes a column for indication of a distinction between video and audio, 404 denotes a column for indication of time durations of the materials, 501 denotes a column for indication of typical source material icons, 502 denotes a column for indication of title names, types and durations of the typical source icons, 503 denotes a column for indication of comments of the materials for their editing, and 504 denotes a column for indication of labels of the source materials.

In FIG. 4, the source icons column 401 shows the source icon 401-1 and source icon 401-2 indicative of source material types. For example, the source icon 401-1 indicates that the source material is a broadcasting program, while the source icon 401-2 indicates that the source material is a scene. Other source icons include an icon indicative of one cut or clip. The source material name column 402 shows names of the source materials given in the source icons column 401 at the left side of the column 402. The video/audio distinction column 403 indicates "A1-2" when the source material is of an audio type, and indicates "V1" when the source material is of a video type. Further, the material duration column 404 given at the right side of the column 403 indicates time lengths or durations of the source materials.

In FIG. 5, the typical material icon column 501 shows therein an audio source icon 501-1, a still image source icon 501-2, a moving image source icon 501-3 accompanied by audio information, a folder icon 501-4, and a moving image source icon 501-5 not accompanied by audio information. The name/type/duration column 502 given at the right side of the column 501 indicates names, types, time lengths, etc. of the source materials given in the typical material icon column 501. For example, the column 502 at the right side of the audio source icon 501-1 shows "name", "moving image" and "time duration" of the source material in question, while the column 502 at the right side of the still image source icon 501-2 shows "name", "still image" and "time duration" of the source material in question. The column 502 a the right side of the moving image source icon 501-3 accompanied by audio information indicates or at the right side of the moving image source icon 501-5 not accompanied by audio information shows "name", "moving image" and "time duration" of the associated source materials. The column 502 at the right side of the folder icon 501-4 shows "folder name", "folder" and "number of source materials in the folder". Further, the comment column 503 describes editing states of the associated source materials or simple information necessary for the associated source materials, and the source material label column 504 describes label names of the source materials. Examples of a nonlinear editing apparatus are disclosed in "Media Suite Pro 1.0 User's Guide" by Avid Technology, Inc., 1994, pages 92, 93, 123 and 125 and in "Adobe Premiere 4.2 User Guide" by Adobe Systems Incorporated, 1997, pages 50 and 55.

In a prior art moving picture editing apparatus called the nonlinear editing apparatus, information accompanied by video information is limited only to the time length of a video source material or producer's comment and can be controlled only so as to give uniform information to respective video source materials. For this reason, the prior art apparatus cannot cope with such various types of video-accompanied information a plurality of layers that are different degrees of abstraction.

In the course of video production, a large amount of individual information related to video production is actually generated in various formats of information, including, for example, such input related information as input date, input location and input intention, such right related information as the right of likeness or portrait, the copyright on music, usable range and use expiration date, such video additive information as film script and caption, and such edit associated information as edit history and time code.

With respect to such video accompanied information, tape based editing (the linear editing apparatus) has been so far conducted in a broadcasting station in such a manner that a video producer keeps these information in different places in the form of a memo note or pad about data collection, editing and broadcasting memo or in the form of a word processor floppy disk. Further, video information per se has been stored in video tape. In this way, information has been stored in different media depending on the type of the information. Therefore information management has had to be separately carried out and thus relations and correlations between the information have had been ambiguous with time passage, leading eventually to scatter and loss of the information. The same situation has been occurred in the conventional linear editing system.

SUMMARY OF THE INVENTION

It is therefore an object of the present invention to provide an apparatus for editing moving picture having an related information called an integrated information management system which can relate image units of a moving picture to additive information associated with the image units and having various types of information.

In accordance with an aspect of the present invention, the above object is attained by providing an apparatus for editing moving picture having related information thereof. This apparatus comprises input means for inputting said moving picture and said related information, said moving picture comprising a plurality of scenes, each scene comprising a plurality of cuts and each cut comprising a plurality of frame images; detecting means for detecting change points of said moving picture and dividing said moving picture into said scenes and cuts; selecting means for extracting a still image representing each of said scenes and cuts; a memory for storing said related information and the representative still images of said scenes and cuts; means for designating said representative still images of said scenes and cuts to edit said moving picture; means for determining a hierarchical structure, said hierarchical structure comprising a plurality of layers in accordance with said scenes and cuts; means for displaying said hierarchical structure and said related information; and a controller for controlling said memory and said display means so that said related information in relation to said representative still images to be displayed is displayed with said representative still images.

In accordance with another aspect of the present invention, the above object is attained by providing a method for integratedly managing a moving picture and additive information under control of a computer, which comprises the steps of displaying selected typical ones of frame images of the moving picture on a display device in the form of a hierarchical structure, and displaying additive information associated with the moving picture on the display device in the form of representation of degrees of abstraction different according to the layers of the hierarchical structure, as associated with the displayed typical frame images.

In accordance with a further aspect of the present invention, there is provided a computer program product which includes a recording medium in which a procedure in the above integrated information management method is recorded in the form of a format readable by the computer.

In the present invention, the typical frame images of the moving picture are related to the respective additive information associated with the images, the additive information is displayed on the screen of the display device as associated with the frame images, and also displayed in the form of representation of different degrees of abstraction different according to the layers of the frame images associated with the additive information in the hierarchical structure of the moving picture. Therefore, the moving picture and additive information can be all managed one-dimensionally on the screen, and thus can support the editing operation of the moving picture so as to match editor's thinking pattern.

BRIEF DESCRIPTION OF THE DRAWINGS

FIG. 5 shows another example of the method for managing and displaying information in the prior art nonlinear editing apparatus;

DESCRIPTION OF THE PREFERRED EMBODIMENTS

Prior to detailed disclosure of an apparatus for editing a moving picture and related information in accordance with an embodiment of the present invention, explanation will first be made as to editor's thought process course when the editor edits a moving picture and as to consideration results by the inventor thereabout.

Figure 8:
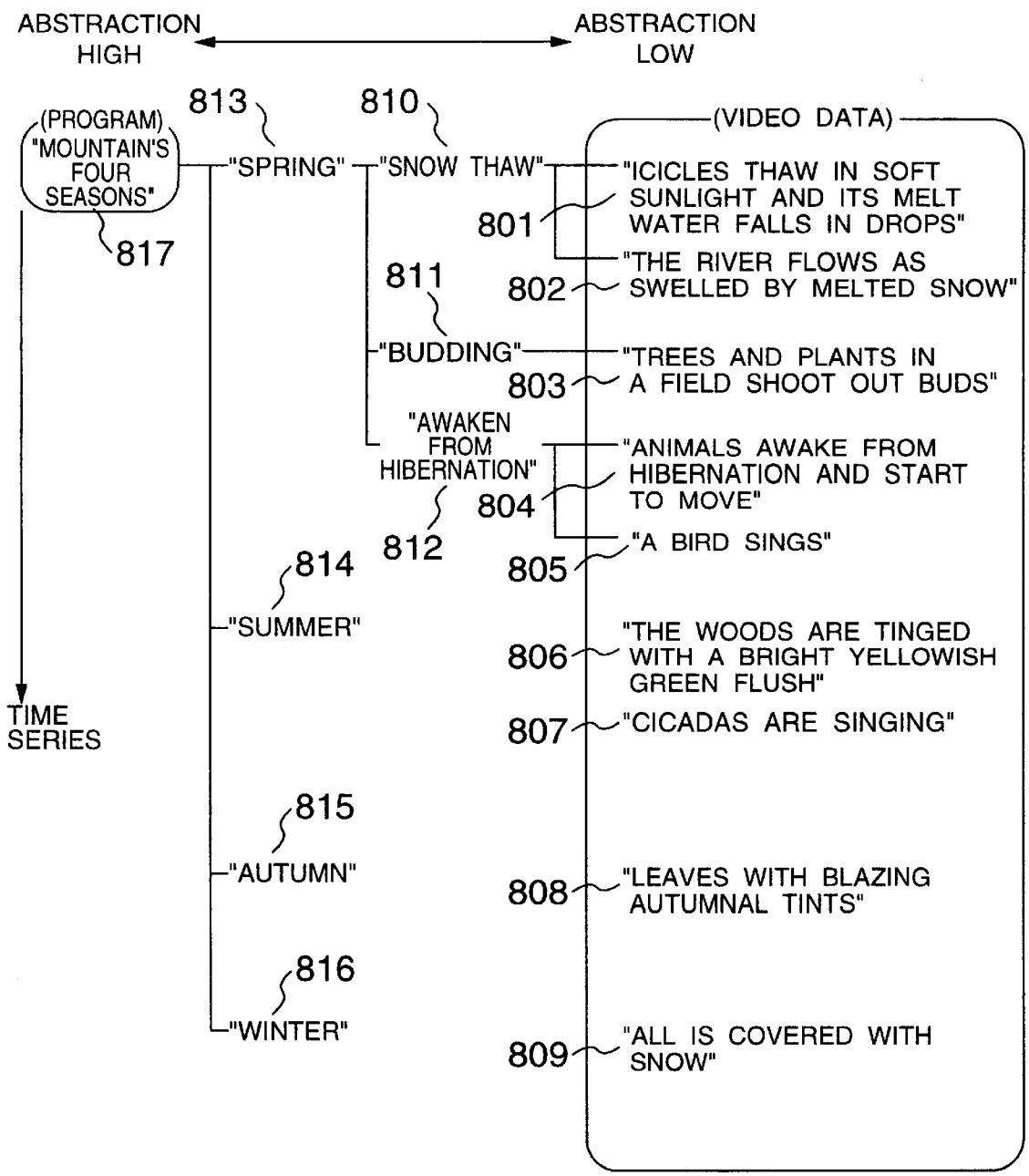
FIG. 8 is a diagram for explaining degrees of abstraction for video associated information.

FIG. 8 is a diagram for explaining degrees of abstraction for video associated information.

SPECIFIC EXAMPLE 1

A documentary program about "four seasons in a mountain" is assumed to be produced in FIG. 8. The program is intended to introduce mountain's four seasons. When a producer produces the program, producer's thinking procedure will be as follows. Already possessed by the producer as on-hand data are video data 801 indicating that "icicles thaw in soft sunlight and its melt water falls in drops", video data 802 indicating that "the river flows as swelled by melted snow", video data 803 indicating that "trees and plants in a field shoot out buds", video data 804 indicating that "animals awake from hibernation and start to move", video data 805 indicating that "a bird sings", video data 806 indicating that "the woods are tinged with a bright yellowish green flush", video data 807 indicating that "cicadas are singing", video data 808 indicating "leaves with blazing autumnal tints", and video data 809 indicating that "all is covered with snow". The producer first of all, looks over these on-hand data in a general way, and plans to introduce video data 817 of "mountain's four seasons" sequentially from spring to winter and to compose the video data 817 into four volumes of "spring" video data 813, "summer" video data 814, "autumn" video data 815 and "winter" video data 816. The concept of dividing the "mountain's four seasons" video data 817 into the four volumes of the "spring" video data 813, "summer" video data 814, "autumn" video data 815 and "winter" video data 816 is more concrete than (lower in abstraction than) the concept of the "mountain's four season" video data 817.

It is also assumed that the producer intends to divide a large volume of the "spring" video data 813 into three parts of "snow thaw" video data 810, "budding" video data 811 and "awaken from hibernation" video data 812. In this case, the concept of the "snow thaw" video data 810, "budding" video data 811 and "awaken from hibernation" video data 812 is higher in concreteness (lower in abstraction) than the concept of the "spring" video data 813.

The producer further thinks of dividing the "snow thaw" video data 810 into two data of the video data 801 of "icicles thaw in soft sunlight and its melt water falls in drops" and the video data 802 of "the river flows as swelled by melted snow"; and also dividing the "budding" video data 803 into two data of the video data 804 of "animals awake from hibernation and start to move" and the video data 805 of "a bird sings".

In this case, the concept of the video data 801 of "icicles thaw in soft sunlight and its melt water falls in drops" is higher in concreteness (lower in abstraction) than the concept of the "snow thaw" video data 810. Further, the major object of the aforementioned program to "introduce mountain's four seasons" is also one of pieces of important video associated information, which information has a level equivalent to the "mountain's four seasons" video data 817.

SPECIFIC EXAMPLE 2

Programs include a narration, which is also one of important pieces of video associated information. The producer thinks of inserting a narration A of "in spring warm sunlight, . . . " for the video data 801 of "icicles thaw in soft sunlight and its melt water falls in drops" and of inserting a narration B of "trees and plants in a field . . . . " for the video data 803 of "trees and plants in a field shoot out buds". In this case, for example, the narration A is related to the video data 801 of "icicles thaw in soft sunlight and its melt water falls in drops", while the narration B is related to the video data 803 of "trees and plants in a field shoot out buds". In this way, if information is required to be related to each video data in a 1:1 relation, the narration information is considered to be information closely associated with the video and having the highest concreteness (lowest abstraction).

Figure 4:
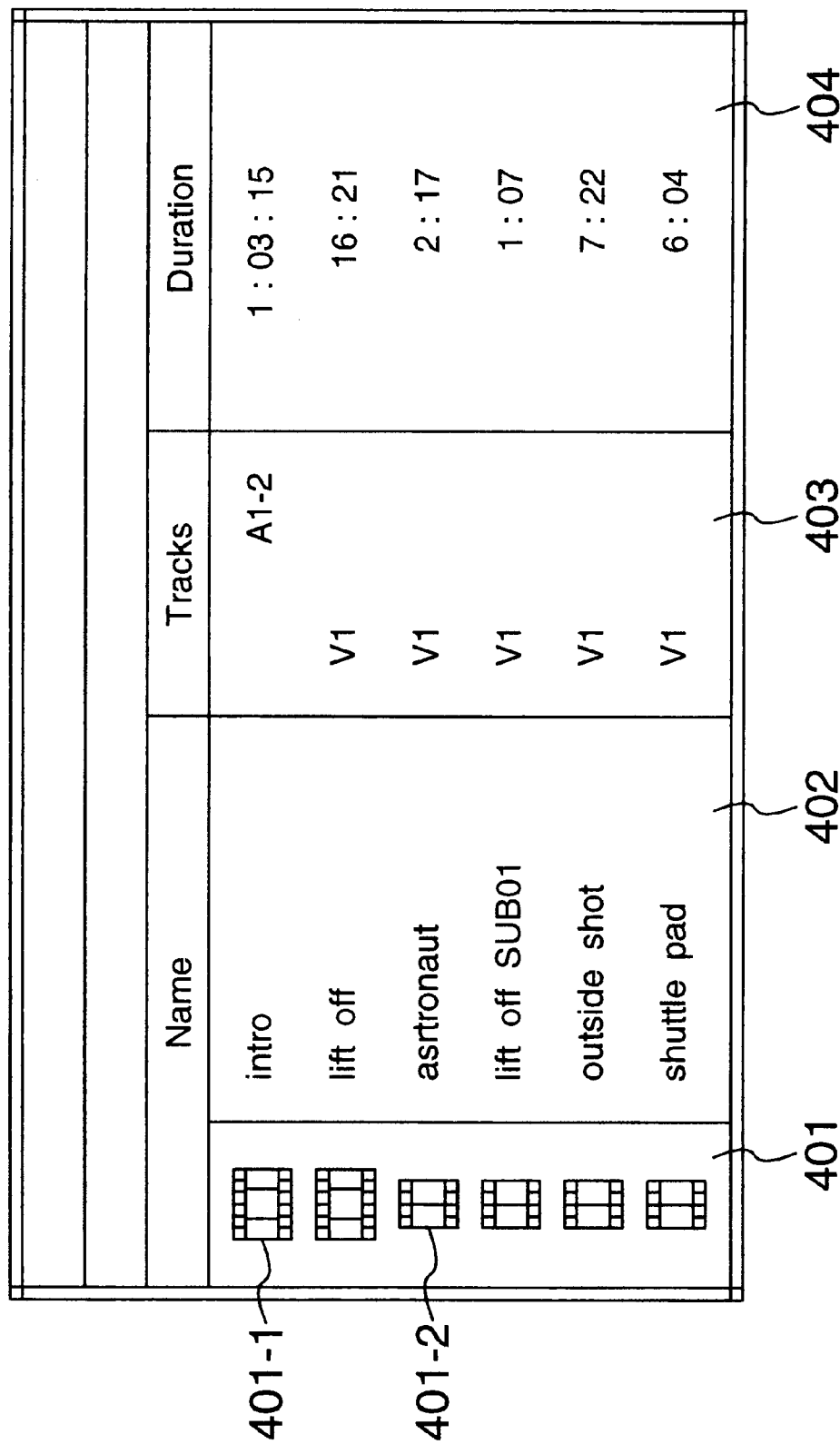
FIG. 4 shows an example of a method for managing and displaying information in a prior art nonlinear editing apparatus.

In such an information management method as in FIGS. 4 and 5, even when the narration information A and B are added to the comment column 503 of source material editing state, for example, it is difficult to say the narration information A and B are related to which video. This also holds true for the same type of information such as caption and speech (words).

SPECIFIC EXAMPLE 3

When a person appears in a duration in a series of produced video pictures, information associated with the person such as the portrait right or profile is also one of pieces of video associated information. Such person information is information applied only to part of the source material, but there is a possibility that such information may reach a massive amount of information depending on the time length and type of the video information. This means that, if it is tried to describe and manage information in such a manner as in FIGS. 4 and 5, then this soon becomes impossible because of a screen space problem.

The aforementioned video associated information column can describe surficial information such as the name and time length of a source material, but it has been difficult to describe information as associated with a flow of video information such as a film script. It has also been impossible to describe information applied only to part of a source material, such as profile information on a person who appears in only part of the source material.

It is usually common practice as in the above specific example 1 that the producer regards and organizes a program as composed as a hierarchical structure. However, a concept generated in the course of producing the program is one of pieces of important video associated information, and information having 4 stages (layers) of abstraction levels ranging from information having the highest abstraction level to information having the lowest abstraction level exist in the single program. It is impossible to describe and manage such information according to the aforementioned prior art information management method.

Further, even when the above narration information is added to the conventional display column in the prior art method as in the above specific example 2, it is impossible to say which narration information is related to which video information. In this way, it is impossible to clearly describe and manage information generated along an editing flow of video information in the prior art method. This also holds true even for the same type of information as caption and speech.

It is clear that the prior art display method involves a screen space problem as in the above specific example 3.

A system for integratedly managing a moving picture and related information provides means for solving the above problem.

An embodiment of the present invention will be explained with reference to FIGS. 11 and 2.

Figure 11:
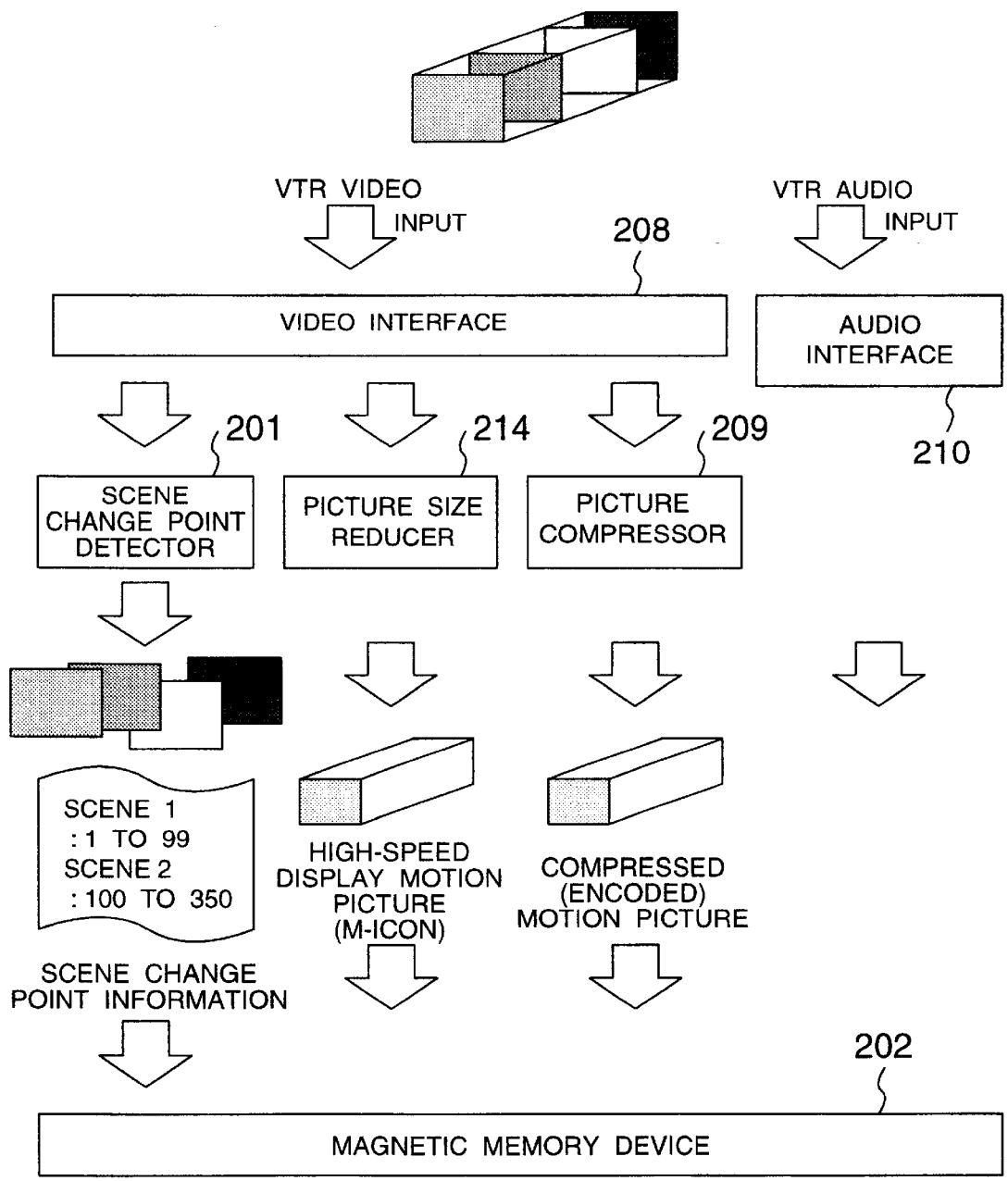
FIG. 11 is a diagram for explaining how to store video information in the present invention.

FIG. 11 is a diagrammatic view for explaining how video and audio information are stored in a magnetic memory device 202. FIG. 2 is a block diagram of an arrangement of a moving picture editing apparatus which has the same arrangement as already explained in connection with the prior art.

Figure 2:
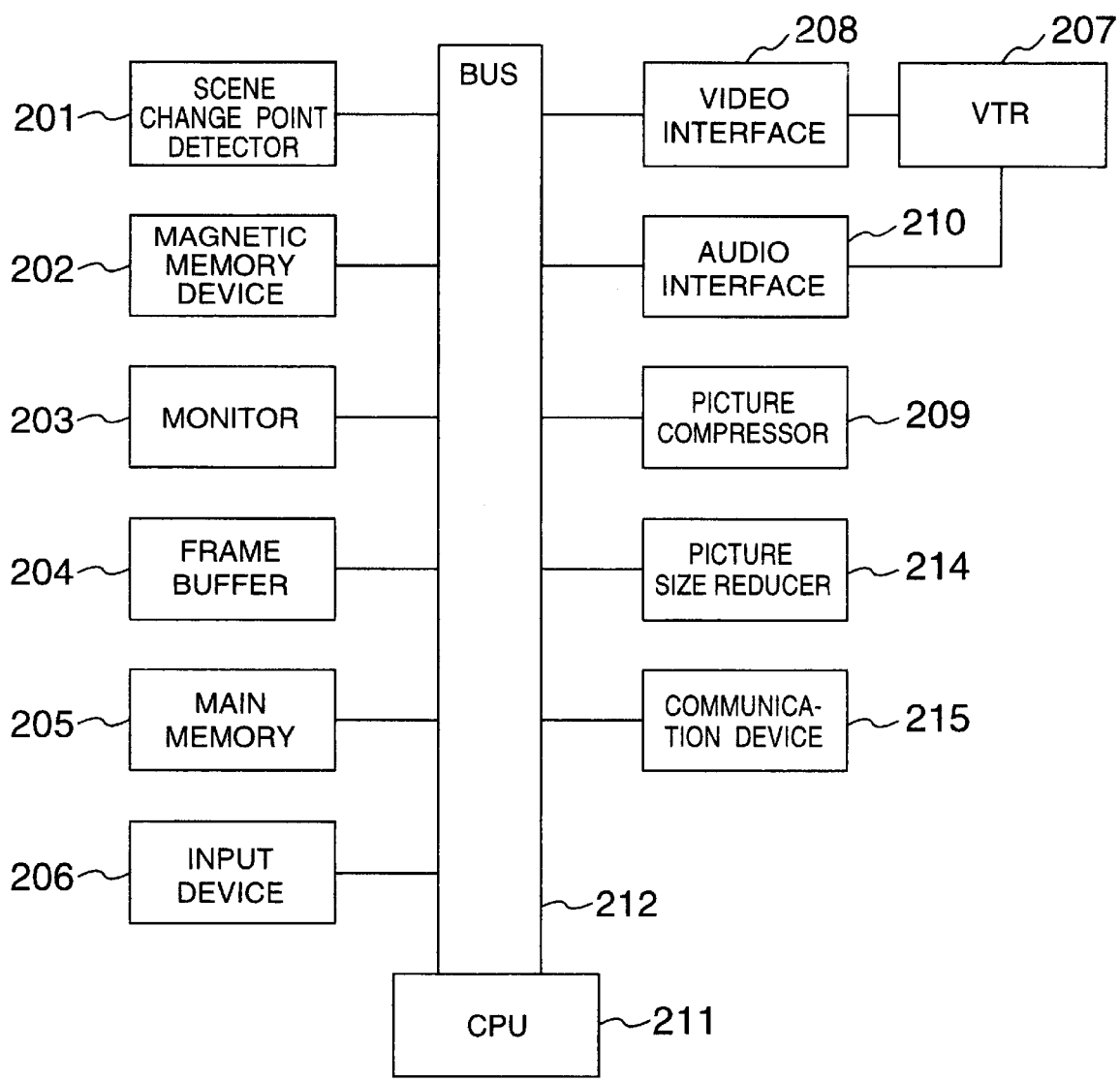
FIG. 2 is a block diagram showing an example of a nonlinear moving picture editing apparatus.

Referring to FIGS. 11 and 2, explanation will be made as to how video and audio information are stored in the magnetic memory device. First, an instruction from the input device 206 causes a video signal to be issued from video tape already loaded in the VTR 207, so that a frame unit of moving picture is sent from the VTR 207 through the video interface 208 and bus 212 to the scene change point detector 201. The above-mentioned video interface is one of the input means. The scene change point detector 201 digitizes the received moving picture, and analyzes color distribution information between images thereof to detect a scene change point and a cut change point. A frame number for the scene change point and a cut change point generated by the scene change point detector 201 is stored in the magnetic memory device 202 as moving picture analysis information (scene/cut change point information). At the same time, an M-icon is stored in the magnetic memory device 202. This M-icon, which is a miniature image (for example, of 80×60 pixels) reduced in size by the picture size reducer 214 according to the size of a GUI environment to be displayed, can be operated in the present editing apparatus. In general, in order to extract a predetermined frame from an encoded moving picture and convert it to a video signal for picture reproduction or reconstruction, it is necessary to decode the encoded moving picture. In this connection, the CPU 211 requires a processing time for decoding the moving pictures. When the miniature image (M-icon) is previously stored as a high-speed display image as in the foregoing embodiment, the need for the decoding time can be eliminated, the processing time can be shortened, and the contents of the image can be quickly confirmed. The above-mentioned audio interface is also one of the input means.

At the same time, the moving picture is encoded by the picture compressor 209 with use of an image compression technique and stored in the magnetic memory device 202. This moving picture (compressed moving picture) is used, for example, when it is desired to see a final edited result in detail. With regard to audio, further, an audio output signal of the VTR 207 is digitized through the audio interface 210 and stored in the magnetic memory device 202.

The operator instructs reading of an M-icon registered in the magnetic memory device 202 with use of such an input device 206 as a mouse or a keyboard. This causes the CPU 211 to read out scene/cut analysis information on the corresponding moving picture from the magnetic memory device 202, and on the basis of the information, to read out only the first frame of each scene or each cut from the M-icon and display it on the monitor 203. The displayed M-icon is to be operated by the present editing apparatus.

Figure 1:
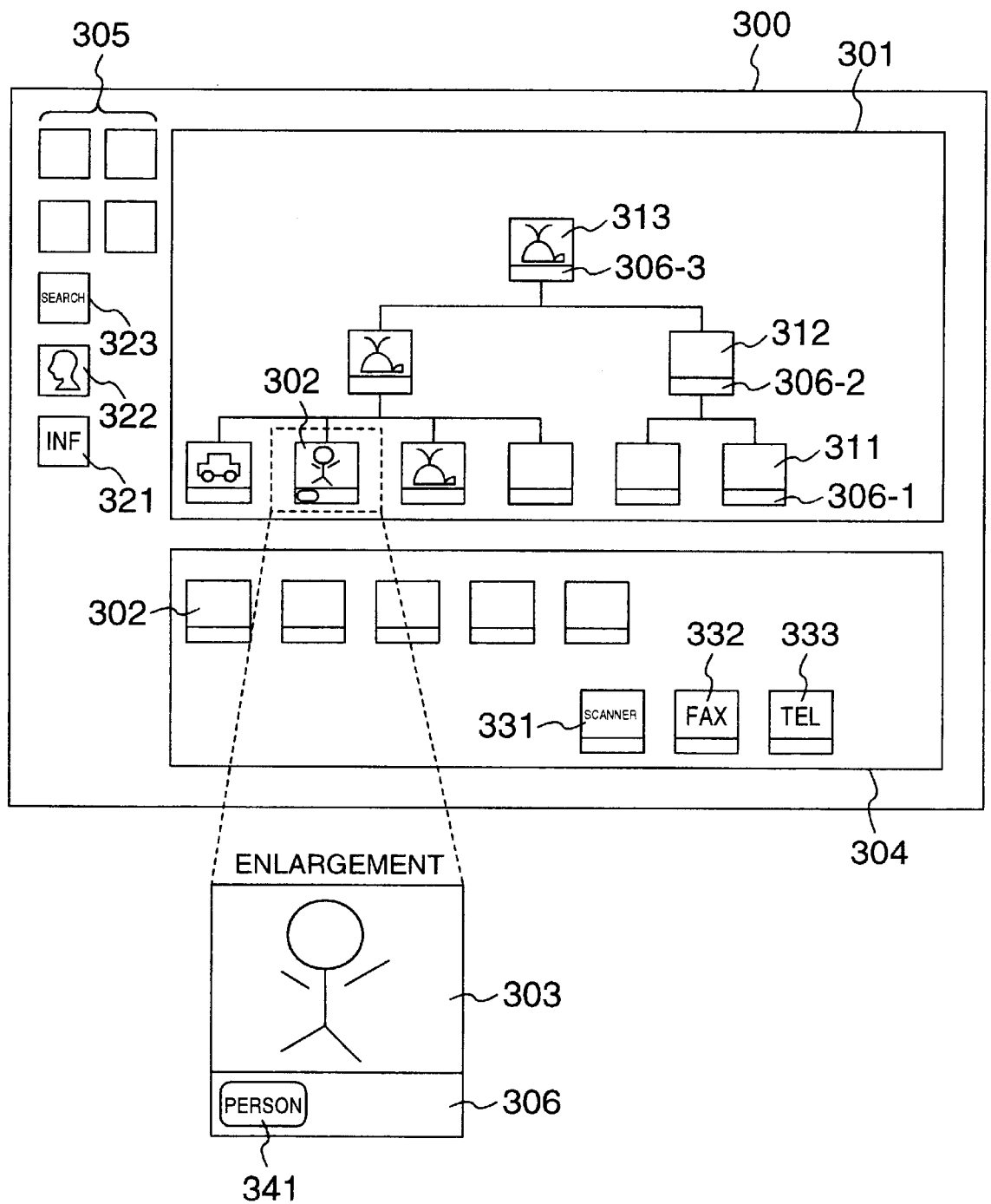
FIG. 1 shows an example of an editing display screen in a moving picture editing apparatus in accordance with the present invention.

FIG. 1 is an example of an editing display screen using the aforementioned M-icon. Reference numerals in FIG. 1 includes, in addition to reference numerals already explained in the display screen of FIG. 3, information existence display zones 306, 306-1, 306-2 and 306-3, a cut or scene M-icon 311, an M-icon 312 of a plurality of cuts or scenes, an M-icon 313 of the entire story, an information button 321, an appearance person detecting button 322, a scanner icon 331, a FAX icon 332, a TEL icon 333 and a portrait right icon 341.

Figure 3:
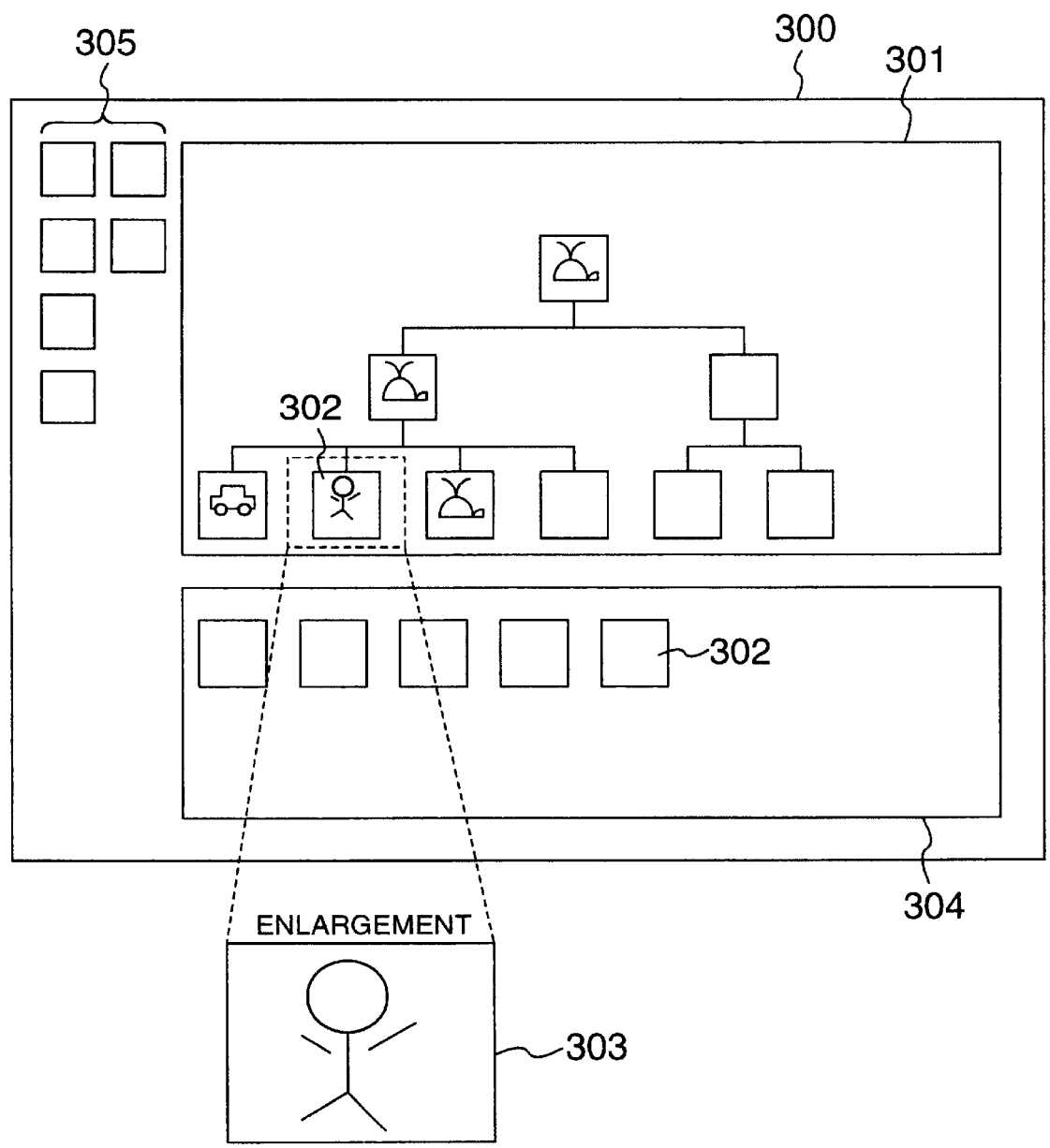
FIG. 3 shows an example of an editing display screen during nonlinear editing operation.

In FIG. 3, the operator organizes the M-icons 302 into such a hierarchical structure as shown in a hierarchical structure display window 301 to thereby make a story. The editing method and system for editing a moving picture by using the editing display screen as shown in FIG. 3 are disclosed, for example, in the specification of co-pending patent application Ser. No. 08/826,975 filed on Apr. 9, 1997. The disclosures of this co-pending application are incorporated herein by reference.

This hierarchical structure editing system has not only an advantage that the operator can visually grasp the video structure easily and can be easily make a story, but also another advantage that this editing system can present an environment optimum for efficient management of video related information having a plurality of layers that are different degrees of abstraction. Explanation will be directed to how to manage information, e.g., in the 3 specific editing examples already explained in connection with FIG. 8.

SPECIFIC EXAMPLE 1

Figure 10:
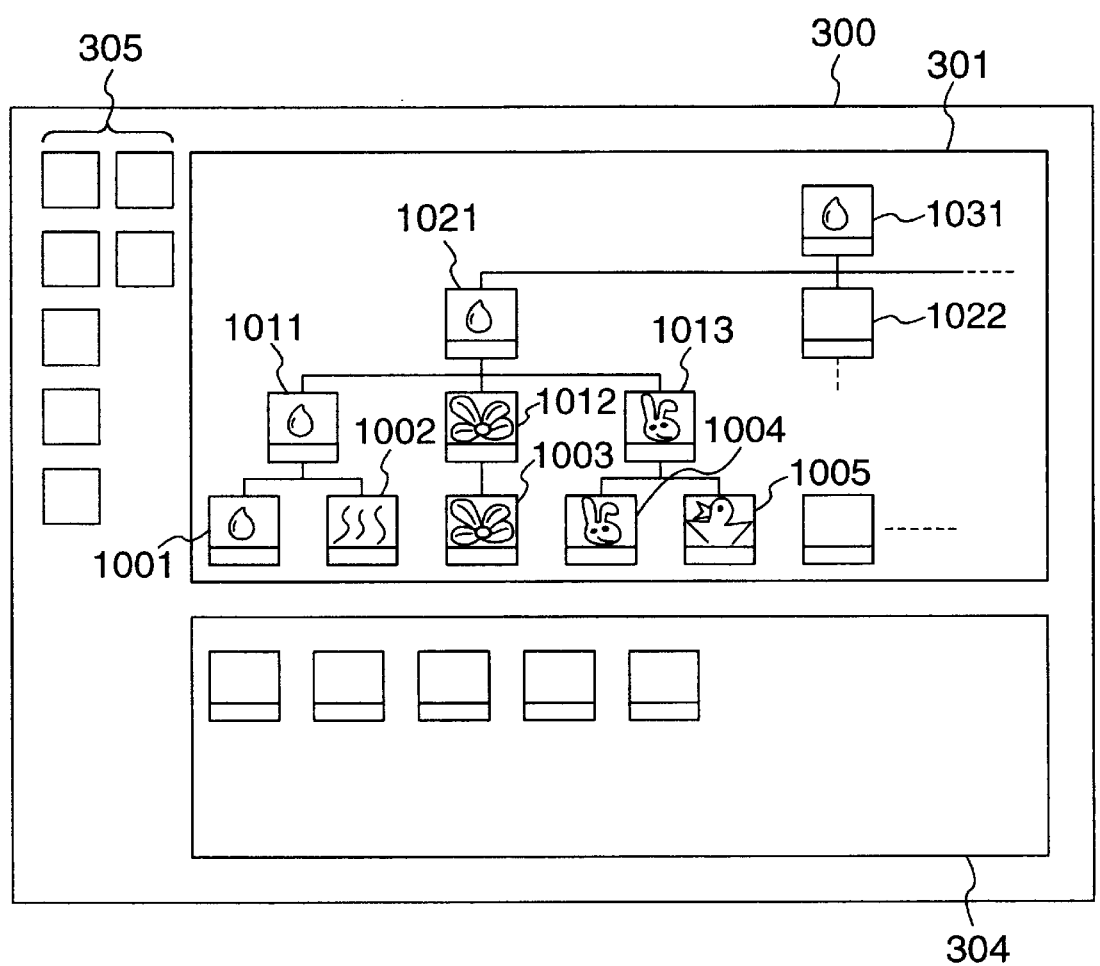
FIG. 10 shows a further example of the editing display screen in the moving picture editing apparatus in accordance with the present invention.

When a documentary program is prepared by the present moving picture editing apparatus, the then display screen is as shown in FIG. 10. FIG. 10 is another example of the editing display screen, in which 1001 to 1005, 1011 to 1013, 1021, 1022 and 1031 denote M-icons and the other reference numerals are the same as those in FIG. 1. The M-icons 1001 to 1005 indicates video data per se. More specifically, the M-icon 1001 indicates the video data 801 of "icicles thaw in soft sunlight and its melt water falls in drops", the M-icon 1002 indicates the video data 802 of "the river flows as swelled by melted snow", the M-icon 1003 indicates the video data 803 of "trees and plants in a field shoot out buds", the M-icon 1004 indicates the video data 804 of "animals awake from hibernation and start to move", and the M-icon 1005 indicates the video data 805 of "a bird sings". Other M-icons not illustrated in the lowermost layer of the hierarchical structure are also similar to the above. Information having lowest one of degrees of abstraction is made to be related to such M-icons in the lowermost layer. For example, the explanation information of "icicles thaw in soft sunlight and its melt water falls in drops" is related to the M-icon 1001, and the explanation information of "the river flows as swelled by melted snow" is related to the M-icon 1002.

In a layer higher by one layer, the M-icons 1001 and 1002 are coupled to form the M-icon 1011. The M-icon 1011 shows one scene consisting of the video data 801 of "icicles thaw in soft sunlight and its melt water falls in drops" and the video data 802 of "the river flows as swelled by melted snow". The M-icon 1011 is made to be related to the aforementioned "snow thaw" explanation information. Similarly, the M-icon 1012 is made to be related to the "budding" explanation information, while the M-icon 1013 is to be related to the "awaken from hibernation" explanation information.

In a layer even higher by one layer, the M-icons 1011, 1012 and 1013 are coupled to form the M-icon 1021. This M-icon 1021 shows one "spring" scene consisting of the three scene parts of "snow thaw", "budding" and "awaken from hibernation". The M-icon 1021 is made to be related to the "spring" explanation information. Similarly, the M-icon 1022 is made to be related to the "summer" explanation information.

The M-icon 1031 in the uppermost layer shows the entire program. The M-icon 1031 is made to be related to the "mountain's four seasons" explanation information or such object information as "to introduce mountain's four seasons".

SPECIFIC EXAMPLE 2

For example, when narration information of "in spring warm sunlight, . . . " is made to be related to the M-icon 1001 in the lowermost layer while narration information of "trees and plants in a field shoot out buds" is to be related to an M-icon 1003, video and narration information can be managed completely in a 1:1 relation.

Further, there may occur such a case that, in the course of video editing, a music is superimposed on the video as a background music (BGM) at a later stage. Such a BGM has related information about its music title, time length, music player and copyright. When it is desired to relate such information to the associated video, BGM in many cases spans a plurality of cuts or scenes. For this reason, BGM is related to a layer higher than a middle layer. When explanation is made in connection with the example of FIG. 10 and a spring BGM is superimposed on the entire "spring" scene; the BGM information is related to the M-icon 1021.

Further, such more global information as a broadcasting schedule for the final edited program is related to the M-icon 1031 in the uppermost layer.

Figure 29:
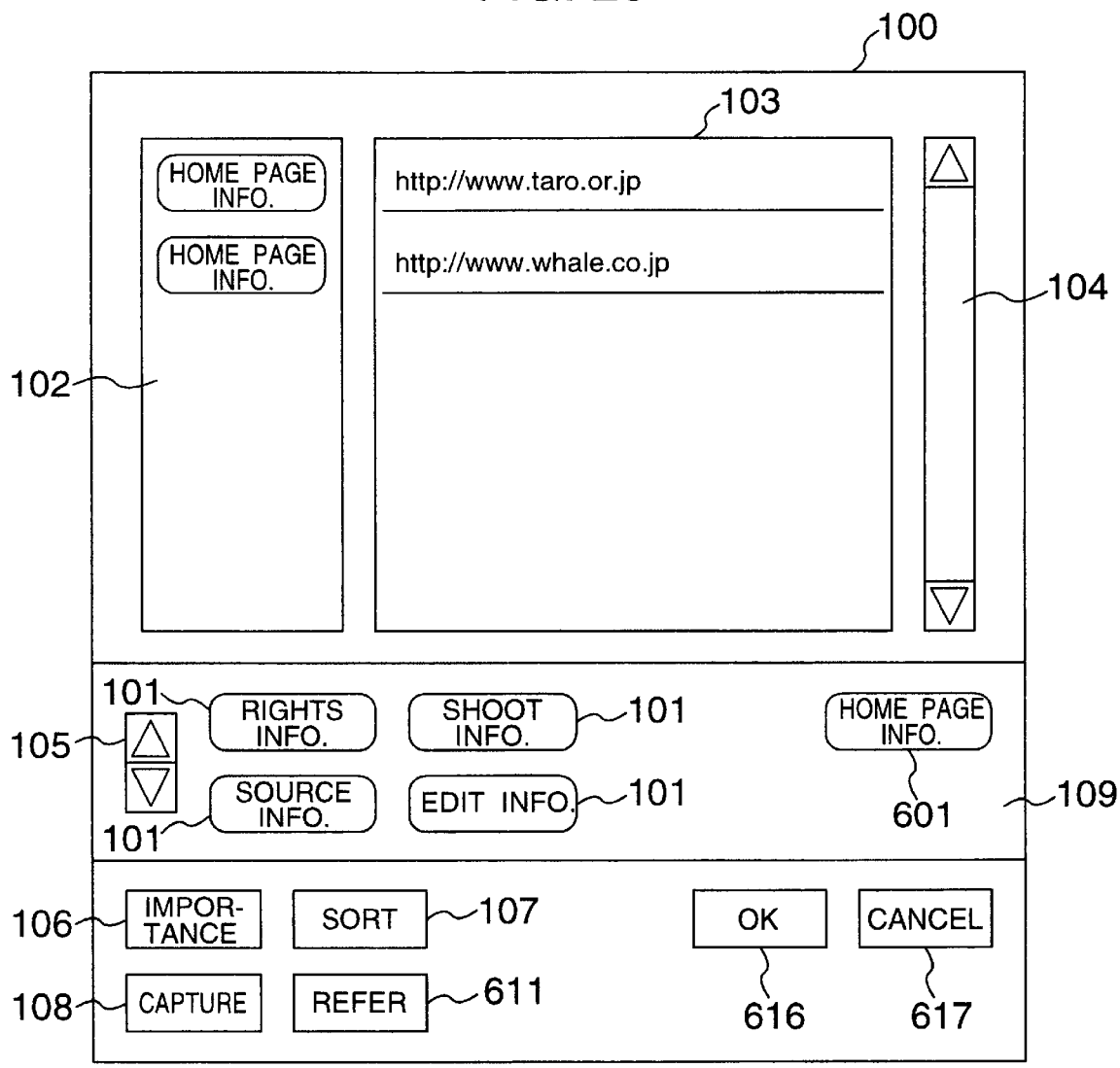
Figure 30:
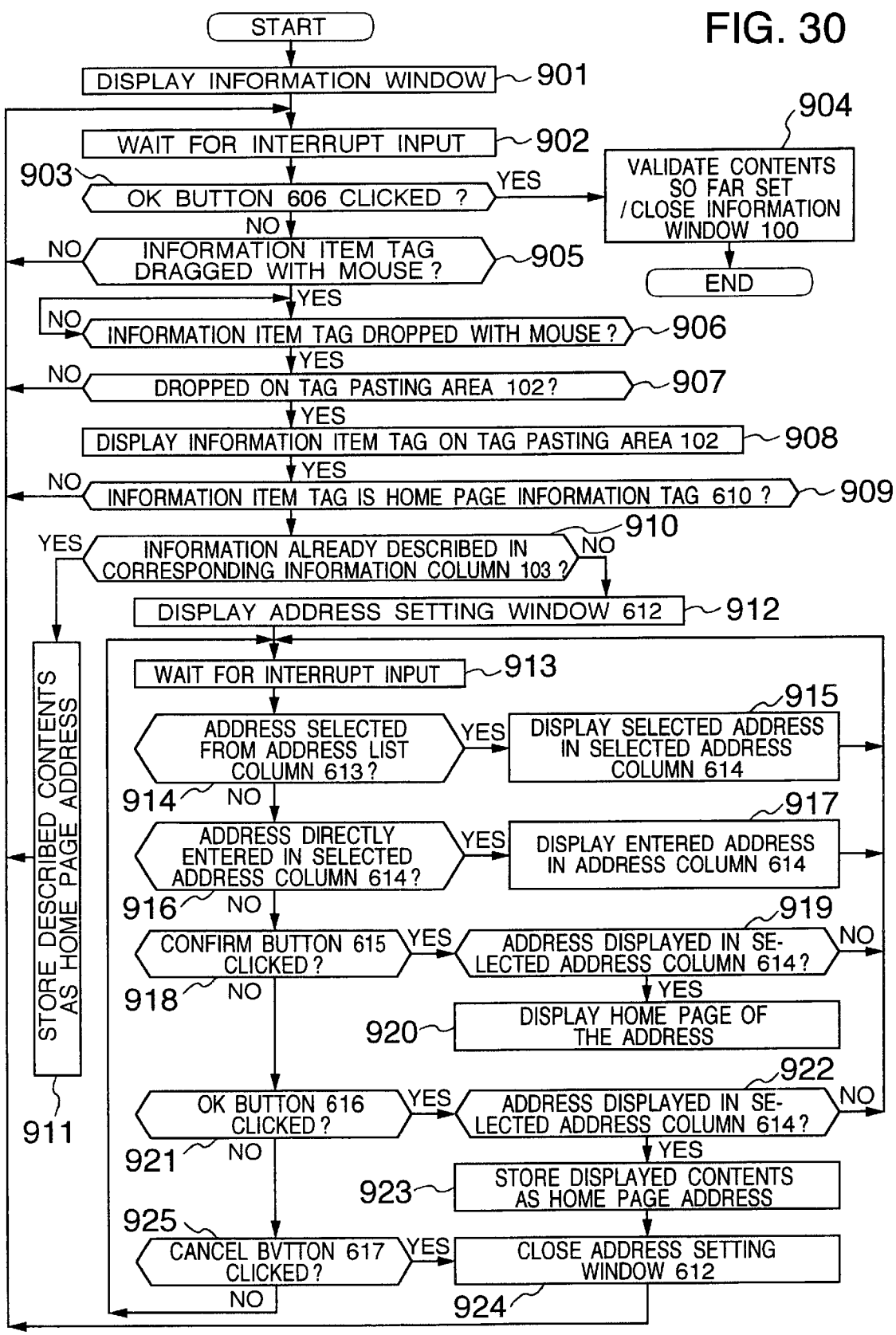
FIG. 30 shows a flowchart for explaining an example of how to set www page information.

FIG. 29 shows a simple example of the hierarchical structure, in which reference numerals 1051 and 1052 denote M-icons in a lower layer of the hierarchical structure, and numeral 1050 denotes an M-icon in an upper layer of the hierarchical structure. When the M-icons 1051 and 1052 are combined, the M-icon 1050 is formed. FIG. 30 is a flowchart for explaining the operation of an exemplary data structure of memory areas of the main memory 205 for storing video related information and icon information as associated therewith. In the drawing, reference numeral 900 denotes icon information of the M-icon 1050, numerals 901 and 902 denote video related information of the M-icon 1051, 903 denotes icon information of the M-icon 1051, 904 and 905 denote video related information of the M-icon 1051, 906 denotes icon information of the M-icon 1052, 907 and 908 denote video related information of the M-icon 1052.

In FIG. 30, the icon information 900 of the M-icon 1050 located in the upper layer of the hierarchical structure contains an M-icon number (or the address of the M-icon, such as "1" for the icon information 900, "2", for the icon information 901, "3" for the icon information 902 for convenience of explanation), a layer level value (1, 2, . . . from the bottom layer), an address for the miniature moving picture image, and address of the icon information of the M-icon in the layer lower by one level and located at the left most position, an address of the icon information of the M-icon located in the same layer and at the right side by one, and an address of the first video related information. Contained in the first video related information 901 are, in addition to such information as "item name", "broadcasting date" and "contents", an address of the next video related information in the case of presence of the next video related information. The same holds true even for the next video related information 902. The icon information 903 of the icon 1051 located in a layer lower than the M-icon 1050 and at the leftmost position is associated by the address stored in the icon information 900 of the M-icon 1050. Contained in the icon information 903 are, in addition to "M-icon number", "layer level value", "address of miniature moving picture display image", "address of M-icon in the same layer and at the right side by one" and "address of the first video related information", such information as "file name of miniature moving picture image" and "cut start/end points" as the M-icon information of the lowermost layer. The same holds true even for the next icon information 906 as in the icon information 906. The video related information 904, 905, 907 and 908 associated with the icon information 903 and 906 are also similar to the video related information 901 and 902, and thus explanation thereof is omitted.

There is an M-icon 1060 (with icon information 909) in the layer higher than the layer of the M-icon 1050. If there is also an M-icon 1061 (with icon information 910) (not shown) in the same layer, then its M-icon number stored in the icon information 900 is also recorded in the icon information 909 as an address, and the M-icon number of the icon information 910 is stored as the address of the icon information of the M-icon located in the same layer as the icon information 900 and at the right side by one therefrom.

In this manner, the hierarchical structure of the M-icons forming the moving picture and video related information are stored as associated with each other in the form of the hierarchical structure.

The "contents" column in the icon information of the video related information stores actual information as character data, or when the video related information is present in another file in such a data format as audio or video, contains address information indicative of the presence location of the file. Further, when the video related information is present in a file of an external information system, the "contents" column of the video related information contains a code or uniform resource locator (URL) for access to the file of the information system.

In this way, the information management method of the present invention based on the linked information to the hierarchical structure enables sophisticated information management according to the degree of abstraction in information.

When such information linking is carried out, for example, on the display screen of FIG. 1, a "script" icon and "caption" icon (not illustrated in FIG. 1) are displayed in an edit associated information zone 306-1 of an M-icon 311 indicative of a cut or scene in a lower layer; a "music" icon, a "player" icon or an "author" icon indicative of a music title, player name or copyright of a BGM is displayed (not illustrated in FIG. 1) in an edit associated information zone 306-2 of an M-icon 312 indicative of a plurality of continuous cuts or scenes in the middle layer; and an "origin" icon indicative of a linked broadcast history is displayed (not illustrated in FIG. 1) in an edit associated information zone 306-3 of an M-icon 313 placed in the uppermost layer and indicative of a story.

In the connection, video associated information, which relates to the miniature moving picture itself and does not depend on the video data combination or the edited result, can be related even in the source material area 304.

The prior art moving picture editing apparatus can perform only uniform management over information having various different degrees of abstraction depending on different video source materials. On the other hand, the management method of the present embodiment based on the aforementioned linking to the hierarchical structure can realize sophisticated information management depending on the information abstraction.

Television broadcasting programs and video programs are divided into full editions containing all videos from the beginning to the very last and digest editions of extraction of only gist. In the present editing apparatus, it is assumed to edit and prepare a full edition of program. In the lower layer of the prepared hierarchical structure, it is judged whether each cut or scene is used for the digest edition, and digest edition usable information is previously given to the cut or scene for use in the digest edition. Further, for switching between the full and digest editions, are previously given (not shown in FIG. 1) in the edit in the uppermost layer. When it is desired to actually use the digest edition, the producer can quickly change the program to its digest edition only by switching the full/digest edition information given in the uppermost layer M-icon to the digest edition. In this way, when individual information are given in the lower layer and its management information is added to the upper layer, one edited result can have many variations for use in various types of broadcast.

Figure 12:
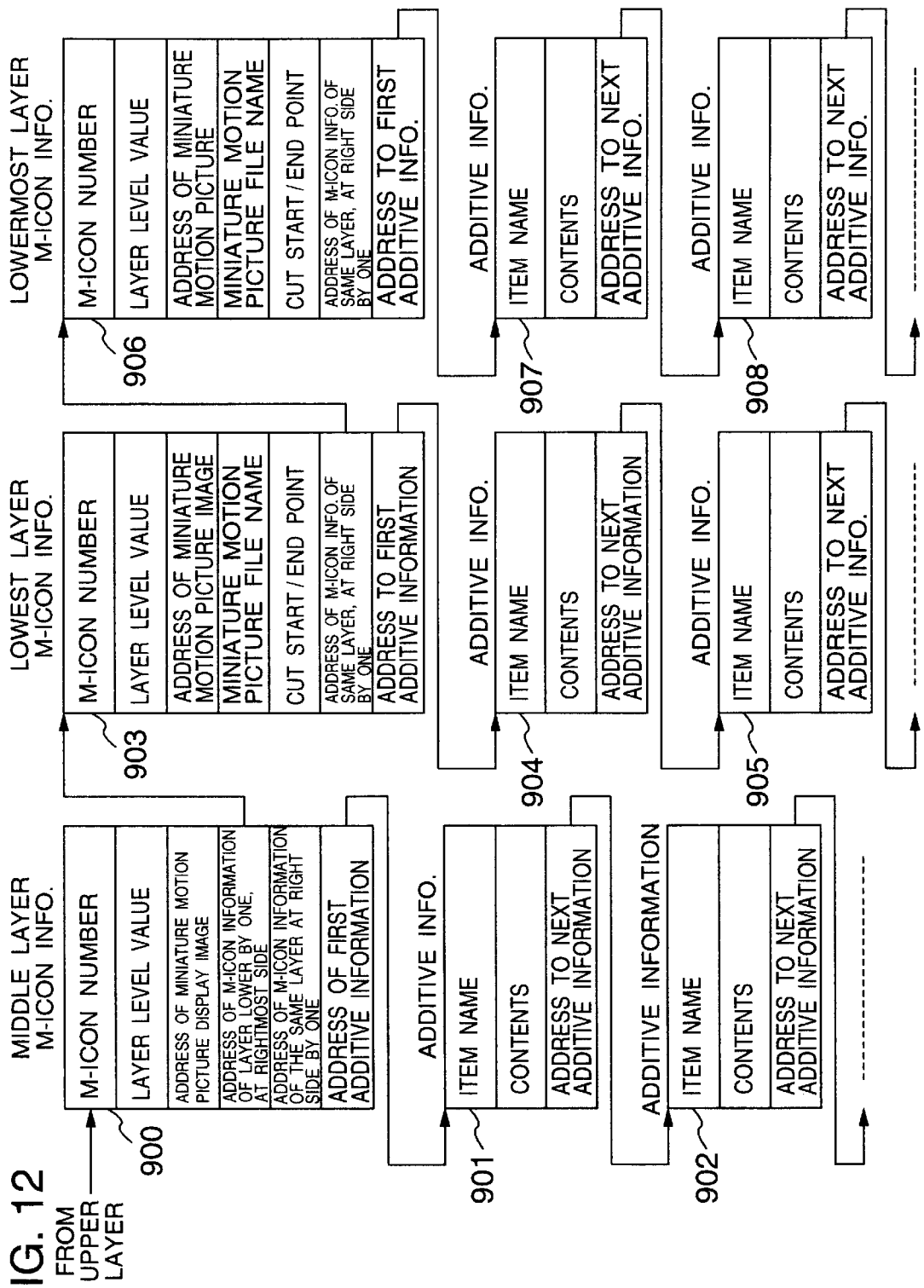
FIG. 12 shows memory areas for storing therein related information and M-icon information associated therewith.

Information for display of such "film script", "caption", "music", "player", "copyright", "origin", "full" and "digest" icons as explained above on the display screen are stored in such memory areas as shown in the example of the related information boxes 801, 802, etc. in FIG. 12. These icon information are automatically generated by the computer according to the contents of the related information. Information for display of the "full" and "digest" icons are management information at the time of outputting or editing specific contents in the related information of the M-icon image. Such management information include, as other information, information for selective allocation to Japanese or English narration.

Explanation will next be made as to how various types of video linked information are input to which computer to be related to video information and as to how the related related information are displayed for the operator in the practical editing apparatus.

An example of an information linking method in the present editing apparatus will be first explained.

Explanation will be made in connection with an example wherein, in such a hierarchical structure as shown in FIG. 1, video linked information, e.g., portrait right information about a person A appearing in the video is present for the typical scene of the M-icon 302.

Media for telling the operator the portrait right information include notepad, facsimile and telephone.

When the portrait right information is told to the operator in the form of notepad, there are two information linking methods which follow.

Figure 6:
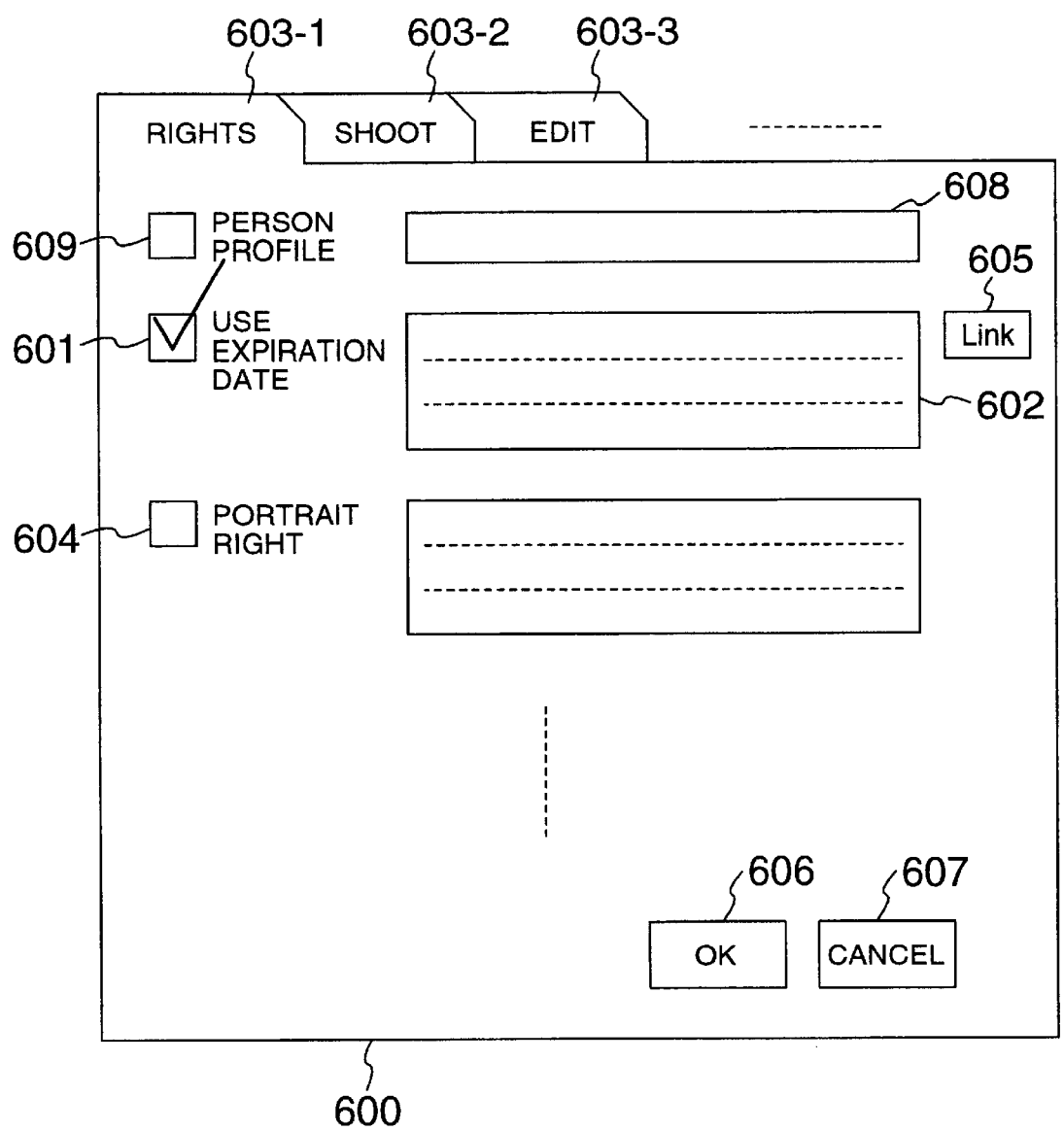
FIG. 6 shows an information window for input and display of various sorts of information in the present invention.

In the first linking method, under a condition that the M-icon 302 is selected with use of the mouse, the mouse is clicked on the information button 321. This causes appearance of such an information window as shown in FIG. 6 for input and display of various types of information on the scene on the monitor 203. In FIG. 6, reference numeral 600 denotes an information window associated with the rights, numeral 601 denotes a check box for activating a portrait right icon, 602 denotes an information column, 603-1, 603-2 and 603-3 denote tag buttons for switching from the current information window to another information window associated with another information-genre, 604 denotes a check box for giving an emphasized indication of the expiration date, 605 denotes a reference button for referring to another linked multimedia information medium, 606 denotes an OK button for validating the input result, and 607 denotes a cancel button for invalidating the input result. The information window is used to display a list of information items and its information contents. The operator writes the contents of the notepad in the information column 602 at the side of the portrait right item with use of such an input device 206 as a keyboard.

Figure 7:
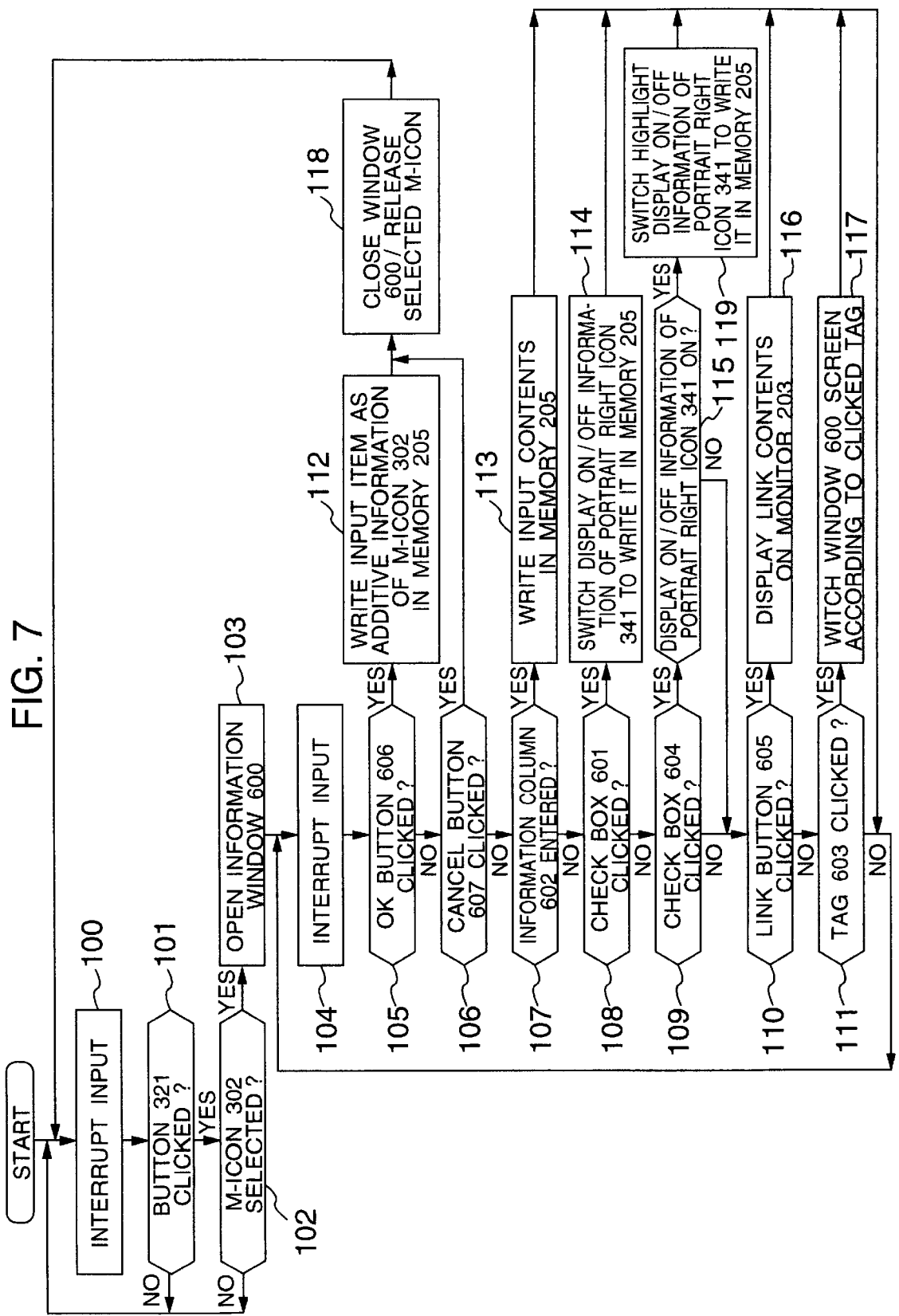
FIG. 7 is a flowchart showing an example of a method for relating video associated information to video data in accordance with the present invention.

When the above is viewed from the apparatus side, its flowchart is as shown in FIG. 7. When an interrupt input is generated (step 100) from the input device 206 (see FIG. 2) such as a mouse, the CPU 211 first checks whether or not the interrupt input results from a depression of the information button 321 (see FIG. 1) (step 101). If so as a result of the check, then the CPU checks whether or not the M-icon 302 was already selected prior to the generation of the interrupt (step 102). When determining that the M-icon 302 was already selected as a result of the check, the CPU causes the information window 600 (see FIG. 6) to be displayed on the monitor 203 (step 103).

Next the CPU 211 waits for an input of an interrupt from such an input device 206 as a mouse or a keyboard(step 104). Generation of the interrupt causes the CPU 211 to execute associated processing operations depending on the type of the interrupt (steps 105 to 111→steps 112 to 119).

For example, in the case of the presence of an input from the keyboard as the input device 206 to the information column 602 (step 107), the CPU 211 writes its input contents in the main memory 205 (step 113).

When the mouse as the input device 206 is clicked on the check box 601 to give a check mark in the box (step 108), the CPU 211 reads out indication on/off information of the portrait right icon 341 from the main memory 205 (in which the indication on/off information is previously stored) and switches it to gain write it in the main memory 205 (step 114).

When the mouse is clicked on the tag 603-1 (step 111), the CPU 211 switches the information genre of the information window 600 to the associated one for its display (step 117).

When the mouse of the input device 206 is clicked on the check box 604 for instruction of emphasized or highlighted indication (step 109), the CPU 211 reads out the indication on/off information of the portrait right icon 341 from the main memory 205. When the indication on/off information is on (step 115), the CPU reads out highlight indication on/off information of the portrait right icon 341 from the main memory 205 (in which the highlight indication on/off information is previously stored), switches it to write it again in the main memory 205 (step 119). When the mouse of the input device 206 is clicked on the reference button 605 (step 110), the CPU 211 checks the presence or absence of these link contents. The presence of the link contents causes the CPU to display it on the monitor 203 (step 116).

When the mouse of the input device 206 is clicked on the OK button 606 (step 105), the CPU 211 reads out all information written in the main memory 205 after the information window 600 is opened and until then from the main memory, and again stores it in the main memory 205 as related information of the M-icon 302 (step 112). And the CPU closes the information window 600 and releases the select state of the M-icon 302 to return it to the initial state (step 118).

When the mouse is clicked on the cancel button 607 (step 106), the CPU discards all information written in the main memory 205 after the information window 600 is opened and until then, closes the information window 600, and releases the select state of the M-icon 302 to return it to the initial state (step 118).

Figure 13:
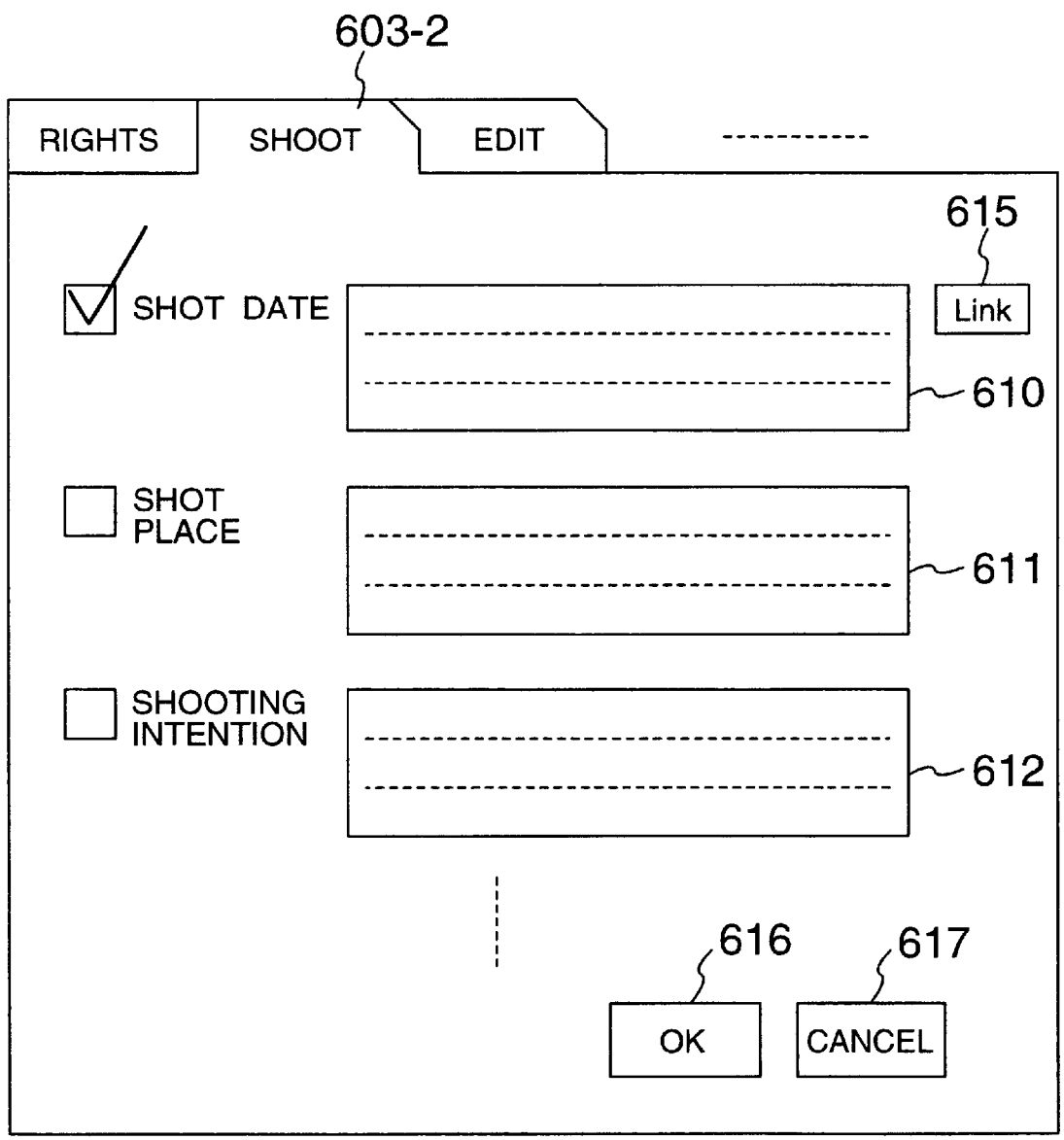
FIG. 13 shows an input display screen for related information relating to input conditions.
Figure 14:
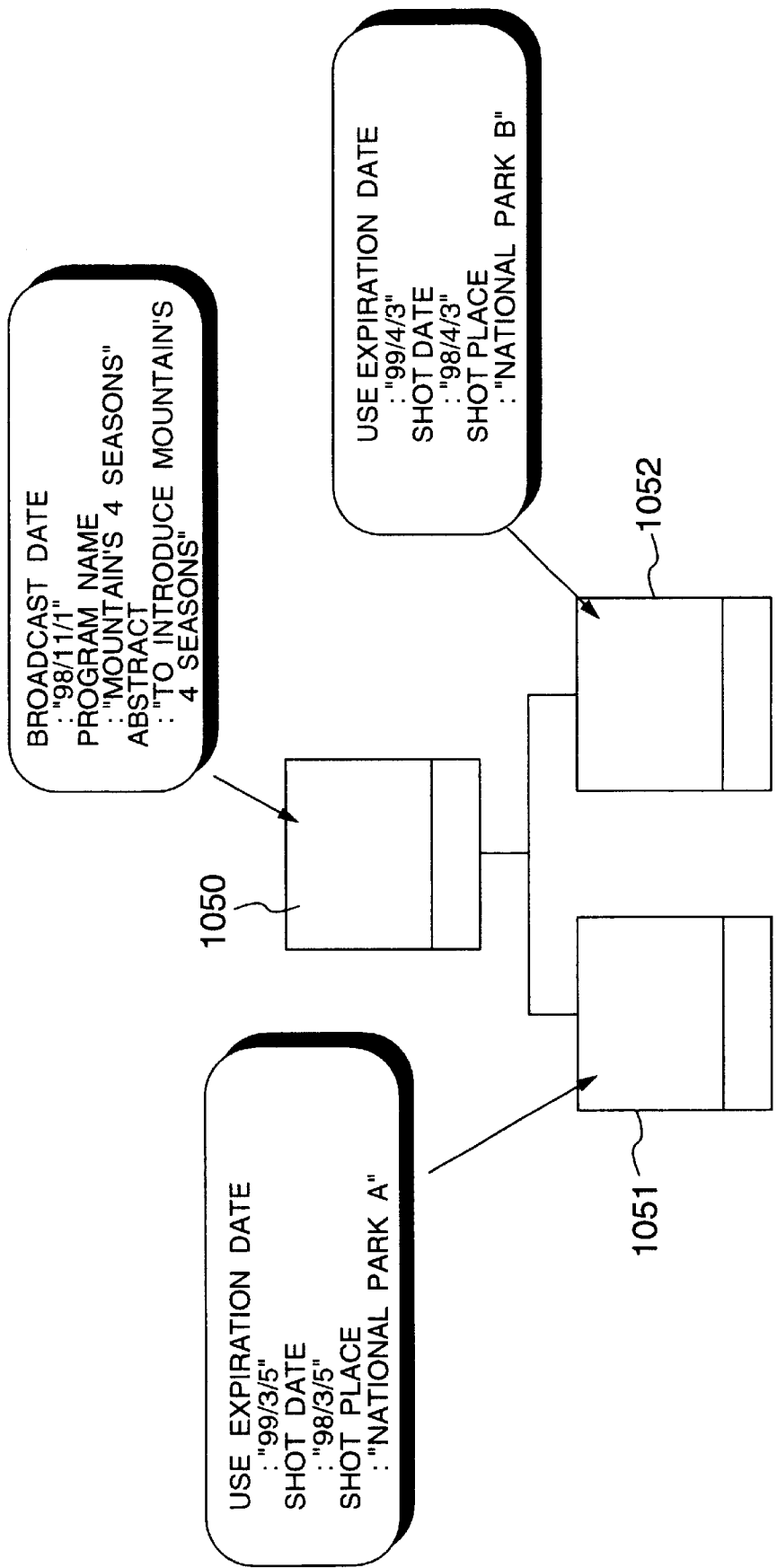
FIG. 14 shows correlations between input associated information and M-icons.

When the mouse is clicked with the mouse pointer placed on the "shoot associated" tag button 603-2 on the screen of FIG. 6, this causes appearance of screen areas or boxes for input of related information of the "shoot associated" shown in FIG. 13 as linked to the M-icon. Shoot date information is entered in a box 610, shoot place information is entered in a box 611, and producer's or shooter's shoot intention is written in a box 612. Relations between the input related information and M-icons are such a hierarchical structure as shown in FIG. 14. Buttons 615, 616 and 617 have substantially the same functions as the buttons 605, 606 and 607 in FIG. 6 respectively.

Figure 15:
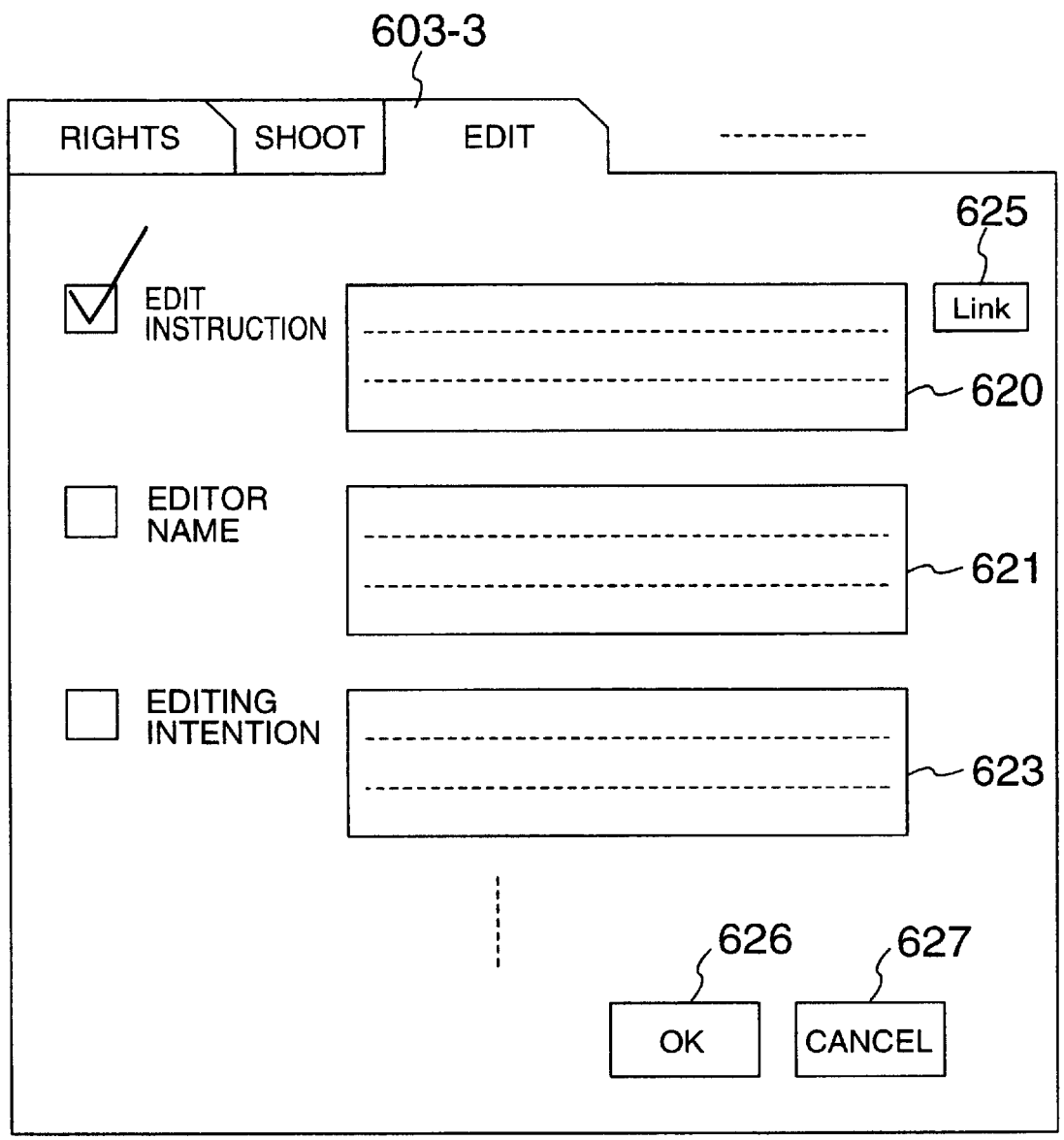
FIG. 15 shows another input display screen for related information relating to input condition.

When the operator clicks the mouse with the mouse pointer placed on the "edit-associated" tag button 603-3 on the display screen of FIG. 6, this causes appearance of screen areas or boxes for input of "edit-associated" related information shown in FIG. 15 as linked to M-icons. Edit instruction information is entered in a box 620, an editor name is entered in a box 621, and producer's or editor's edit intention is written in a box 622. Buttons 625, 626 and 627 have substantially the same functions as the buttons 605, 606 and 607 in FIG. 6 respectively.

In this manner, individual linking is realized.

The other linking method when portrait information is given in the form of a notepad is to use a scanner. The operator use the scanner to input image data on the notepad into a computer. This causes the input image data to be displayed as the scanner icon 331 in the source material area 304 of FIG. 1. The operator drugs the scanner icon 331 and drops it in the M-icon 302 with use of the mouse. The computer applies a character recognition technique to the dropped image data to automatically judge that the data is a description on the portrait right, and inputs it in the portrait right item. In this manner, the portrait right information is linked to the M-icon 302.

If the information is input from a facsimile machine directly into the computer, then the information is similarly indicated in the source material area as the FAX icon 332. When the operator drags the FAX icon and drops it in the M-icon 302, this causes the data to be input to the portrait right item.

When related information comes from a telephone, its voice is input to the computer. The input voice data is indicated in the source material area 304 as the TEL icon 333, followed by such operations as mentioned above.

Although how to input multimedia information has been explained, as an example, in connection with multimedia icons such as the scanner icon 331, FAX icon 332 and TEL icon 333 as typical ones in FIG. 1, it will be obvious that another input method may be employed. Further, the multimedia icons may be displayed in an area other than the source material area 304 or in another opened window, and one type of icons, e.g., a plurality of scanner icons may be employed. Furthermore, when it is impossible to display the icons on a single screen, the screen may be switched by a screen scrolling function or page changing function.

Figure 9:
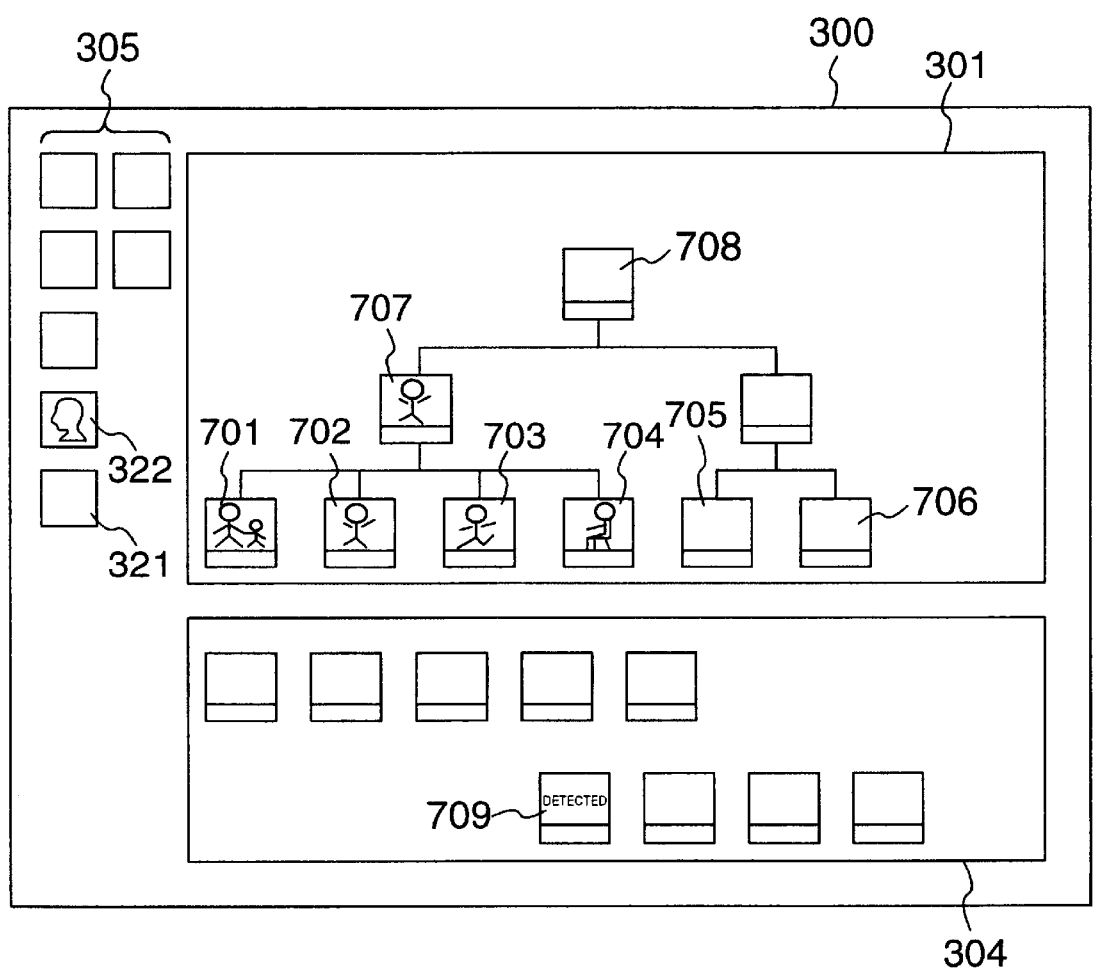
FIG. 9 shows another example of the editing display screen in the moving picture editing apparatus in accordance with the present invention.

FIG. 9 is a view for explaining a case where it is desired to link identical portrait right information to a series of a plurality of scenes. Reference numerals 701 to 706 denote M-icons indicative of cuts or scenes respectively, numeral 707 denotes an M-icon indicative of a collection of the M-icons 701 to 704, and 708 denotes an M-icon indicative of a collection of all the M-icons 701 to 706 on the screen. When it is desired to link specific ones of the M-icons 701 to 706 with a specific information, it is only required to select a plurality of M-icons from the M-icons 701 to 706 and to subject the selected icons to the similar operations to the above. When M-icons to be selected are the icons 701 to 704, linking may be realized by selecting its upper-layer M-icon 707, or by linking M-icons located still in the source material area 304 and not edited yet.

The above procedure is when it is desired to link the portrait right information to the specific M-icon 302. When it is difficult to know which scene where the person A appears at a first glance or it is troublesome to select a plurality of M-icons because of a large amount of M-icons, there is a convenient linking method, which will be explained in connection with FIG. 9 as an example. Assuming that the person A appears only in the M-icons 701 and 703 in the scenes of the M-icons 701 to 706, then the operator first selects the M-icon 708 in the uppermost layer indicative of the entire story, and clicks on the appearance person detecting button 322. The M-icon to be selected is not limited only to one in the uppermost layer. Thus, when a duration where the person A appears is previously known, the M-icon in its upper layer, e.g., the M-icon 707 may be selected. That is, video data belonging to the M-icon 708, i.e., video data of the M-icons 701 to 706 are displayed in the form of a list spaced at suitable intervals. The operator searches the icons for one where the person A appears and issues a instruction indicating that the icon has the person A with use of mousers click. And for starting the detection, the operator clicks on the appearance person detecting button 322.

The editing apparatus extracts features of the instructed person A, e.g., skin color, hair color, height, etc. therefrom, and detect, on the basis of the extracted features, the person A from the videos of the M-icons 701 to 706. This function of detecting videos including the specific target person can use such a technique as disclosed in, e.g., JP-A-6-223179 or JP-A-9-179880. This technique is based on the image recognition technique similarly to the aforementioned scene change point detecting method. Completion of the detecting operation causes the icon indicative of an abstract of the obtained detected information, that is, the M-icon 709 having the person A detected therefrom to be created and displayed. When the M-icon 709 is selected with the mouse click and such information as, for example, portrait right information is linked thereto by the aforementioned keyboard input method or by a drag & drop method; the information is automatically distributed to all the M-icons 701 and 704 containing the person A and thus the linking is finished at a time. This function enables various types of linking, for example, linking of product manufacturer's information of routine voice often used in a commercial message such as a product catch phrase (detected by the voice recognition technique) broadcasted together with its video in a commercial message to the detected scenes, or linking of sea information of specific effect sound such as sound of sea waves detected by the voice recognition technique to the detected scenes.

In this way, the video analyzed information obtained by the video analysis technique is effectively utilized to realize more flexible linking of the video information to video associated information.

Explanation will next be made as to how to display the linked information.

In the above method, the M-icon 302 linked to the portrait right information has an information zone 306 in a lower part of its miniature moving picture, in which a small portrait right icon 341 is displayed. The portrait right information indicates that the portrait right information is linked to the scene. As a result, it becomes quite clear that what kind of information is attached to the scene and thus this draws attention of the editor who wants to use the scene. This icon may use, in addition to character, symbol, illustration, picture, etc., as a matter of course. In the scene having video expiration date information attached thereto, when the date is already expired or comes close thereto, it is indicated by the button using a featured color or frame. This is highly effective to avoid the scene having the due expiration date from its erroneous use. In this way, by emphasizing it by changing the color, more detailed information can be given to the display. This can also be realized by changing the size or using a decorated frame.

When the operator wants to see the contents of information linked to the typical scene such as the M-icon 302 in FIG. 1, the operator clicks the mouse on the information button 321 (see FIG. 1) under a condition that the M-icon 302 is already selected with use of the icon. This causes appearance of such an information window 600 as shown in FIG. 6. The information window 600 is divided into a plurality of subwindows for different genres such as shoot associated information, rights associated information, video related information and edit associated information. Change-over between the subwindows is carried out by selecting one of the tag buttons 603-1 to 603-3. The turning ON of OFF of the indication of the aforementioned portrait right icon 341 is carried out by checking or not checking the check box 601. In the above linking method, with regard to the items of information received from an electronic medium such as a facsimile machine or a scanner, the reference button 605 next to the information column 602 is displayed. When the operator clicks the mouse on the reference button 605, image data input by the facsimile machine or scanner is displayed on the monitor 203. Also displayed on the monitor is such information as facsimile number, etc. of the sender. Further, voice information obtained from a telephone is also similarly reproduced by clicking on the reference button 605. In this way, the present invention is equipped with an easy calling method from the information window to each multimedia information.

Further, for example, when profile information about the appearance person is present in an internet www page, this reference button can also be used when the operator enters its front page address in the person profile item 608 to refer to the front page.

When the operator wants to search for a group of the linked information pieces, it can be realized in such a manner as will be explained below. The operator first selects an M-icon in the uppermost layer of the hierarchical structure located higher than a layer containing an icon for which he wants to search in the display screen of FIG. 1. If necessary, a plurality of the uppermost layer M-icons may be selected. Under this condition, when the operator clicks on a search button 323 in a group of various kinds of function buttons 305, a window for entrance of searching conditions appears. The searching conditions include such a key word condition as, e.g., name or date, and such a quantitative condition of a feature extracted based on an application of the above image recognition technique as, e.g., a woman or women with brownish hair. Or when such information as camera work information is already linked, a condition of zooming-in video can be used as the searching condition.

After entering a search condition, the operator clicks on the search button, which starts searching operation. After completion of the search, its searched result is displayed. In the case of presence of the searched result, the corresponding M-icon is highlighted with color. In the case of absence of the searched result, a message saying its failure is displayed.

When the operator selects the FAX icon 332 as the typical multimedia icon and clicks on the search button 323, all the M-icons associated with the facsimile information are highlighted. This holds true even for another scan icon.

The search in this case corresponds to a reverse of the calling of the multimedia information from the video information by the reference button 605 (see FIG. 6). That is, bi-directional calling method is realized.

Further, even when the operator selects the person icon 709 as the typical video analysis information button obtained based on the application of the video analysis technique, all the M-icons linked thereto are similarly highlighted, enabling quick searching operation.

Next explanation will be made as to the information input method (fixed format system) of FIG. 6 and another information input method (which will be referred to as the free-format system, hereinafter).

Video associated information are divided into many types of genres. For the purpose of managing such information, it is general to dividing such information into similar groups. However, such information grouping varies from information user to information user or from production site to production site. For example, in a certain production site, a producer wishes to collect rights associated information as one group for easy seeing of them as a list, because he considers the rights associated information to be important from the business viewpoint. In another production site, a producer may want to collect only use expiration date information on necessary videos as one group since all the rights associated information are not necessary. Further, even the types per se of necessary information may vary from user to user or from production site to production site. Furthermore, video associated information are not always present equally for all source videos. For example, portrait rights will not be present for all video materials and some video materials have no portrait rights. In this way, video associated information is, in other words, a small amount and wide range of types of information.

In the fixed format system, information columns are previously prepared equally for all source materials. In order to cope with a diverse range of types of information, it is necessary in this system to install a multiplicity of information columns. This system presents no problem so long as information are attached to or written in all the multiplicity of information columns. In actual, however, most video associated information are, in many cases, a small amount and many types of information. In other words, only part of the installed information columns is used and many of the information columns are blanked. That is, a needless GUI space must be prepared for such blank columns.

Further, an increase in the GUI space involves another problem that the operator cannot grasp the presence of information. In addition, even when a plurality of information pieces of an identical type are present, it is hard to manage them.

This will be explained by referring to FIG. 5 already explained in the prior art. In FIG. 5, there are 3 types of typical information columns, that is, the name column 502, comment column 503 and label column 504. The name column is used for entry and display of the names or type of source materials or folder, time lengths of the source materials or the number of source materials in the folder. This types of information are always present for any source materials. As will be seen from FIG. 5, such information are written in all the rows of the name column, and thus there is no needless space from the viewpoint of GUI space. However, when attention is directed to the comment column next to the name column, the rows of the comment column for the audio source icon 501-1 and folder icon 501-4 are blanked. Similarly, some rows of the label column are also blanked. These blanks are a needless part of the GUI space.

In this example, since the number of source materials is 5 and the number of information types is 3, such blanks will not cause a serious problem. However, when the number of source materials or the number of information types is increased, a wasteful part in the GUI space involves a significant problem. For the moving image source icon 501-5, further, such comment information as "Cut before she swings back 0:00:02:07" is already placed in the information column 503. When the operator wishes to add other comment information to the column 503, however, the number of lines in the entry column must be increased. An increase in the number of lines also causes increase of the numbers of lines in the name column and label column, thus resulting in wasteful use of the GUI space.

GUI problems will be discussed above.

Explanation will be directed first to a handling problem.

In a moving picture editing site, it is often that such source material information as the name and time length of a shot video source material, such rights information as use expiration date and usable range, and such edit instruction information as how the video source material is edited and the final time length of finally processed video data are given to the operator in the form of a manually-written notepad from shoot information of the shot video source material such as shot date and shot location. As a computer-supported editing apparatus is introduced in a moving picture editing site, such a notepad has been changed from its physical notepad to a text file form readable by a computer. There is a case where a description of such related information already exists in the form of a text file and it is desired to input the text file into the editing apparatus through a floppy disk or internet or intranet and to divide it and add it according to the information type. In this case, according to the fixed format system, the operator must conduct such operational steps as to open the text file, find corresponding contents therefrom, cut out its character string with use of a mouse, copy it on a memory, set a corresponding information column in its enterable state by the aforementioned method, and then pasting it into the column.

Further, when the operator wants to shift it to an item belonging to the entered information, he must perform such steps as to re-enter the information in an information column as its shift destination and then to erase the information at the shift originator. In this way, the operational steps are troublesome.

Explanation will next be directed to an operation problem.

As has been explained above, in the moving picture editing site, various sorts of information are generated, and there occurs such a case that some of the information cannot be suitably divided into prepared information classifications. Further, in some cases, a plurality of information pieces are combined and transmitted in the form of a single sentence. There are cases where the operator wants to link such combined information as it is or to temporarily enter it with intent to later allocate the information pieces to respective data.

In the above case, the fixed format system is inconvenient because the system always requires that the generated information be subdivided and linked.

Explanation will then be made below as to such a system that, in the above case, can flexibly input and display a small amount and many types of video associated information.

With respect to the GUI space problem, first of all, the present invention can eliminate the need for previously preparing a pair of information item and column as in the prior art system, and can take such a form as to enter any format (such as a list or sentence) of information in a general information column and then to paste a tag button of an information item corresponding to the input information. In other words, a necessary GUI space is allocated to a necessary location and any unnecessary GUI space for non-existing information is not provided. Further, since necessary information is arranged to be displayed quickly by means of a sort button, which facilitates confirmation of the information. Even when a plurality of information pieces of an identical type are present for an identical source material, an information item tag can be pasted a plurality of times for the respective information pieces, thus enabling easy and flexible handling of information.

With respect to the handling problem, in the present invention, when related information is given in the form of a test file, an enter button to be explained later is used so as to be able to enter the information as it is into the moving picture editing apparatus. Accordingly, it becomes unnecessary to conduct troublesome operating steps as in the prior art. Further, since the operator can examine the contents of the entered information, he can perform information input or addition as if he proofread a text. In addition, since modification of already added information is realized in such one action as drag & paste a new information item tag on it, the handling procedure can be simplified.

With regard to the operation problem, since information columns for entry of any format (such as a list or sentence) of formation as well as information item tags prepared in the form of a hierarchical structure are employed, the need for previously dividing and inputting information as in the fixed format system can be eliminated, and thus it becomes possible to add the information roughly as the first step at the current stage and to later allocate it. The preparation of the information items in a hierarchical structure is because, when related information is not suitably or closely applied to one of the prepared information items, an information item tag in a layer higher than the layer containing the information items and containing the concept of the related information can be used, enabling flexible and quick handling thereof. In addition, the tree-structured arrangement of the information item tags has an additional advantage that a desired tag button can be easily searched.

Addition of a information type only requires addition of its information item tag. Even the hierarchical structure of the information item tags can also be set. Accordingly the present invention can flexibly cope with any application of the moving picture editing site in use.

Explanation will be made in detail as to how to input and display video associated information based on the free format system, by referring to specific embodiments which follow.

Steps until an information window is called are substantially the same as those in the fixed format system. The called window is as shown in FIGS. 16 to 21. These drawings show views for explaining how to input and display a free format type of video associated information on the information window. In the drawings, reference numeral 100 denotes an information window, numeral 101 denotes information item tags for various types of video associated information, 102 denotes a tag pasting area for pasting of an information item tag, 103 denotes an information column for entry of any format, 104 denotes a scroll bar for setting of an indication range of the information column, 105 denotes a change-over button for switching of an information item tag to be displayed, 106 denotes an importance setting button for setting an information importance or weight, 107 denotes a sort button for instructing the rearrangement of the information indicated in the information column, 108 denotes an input button for instructing an input of contents of text file, 606 denotes an OK button for validating the input result, and 607 denotes a cancel button for invalidating the input result.

Figure 16:
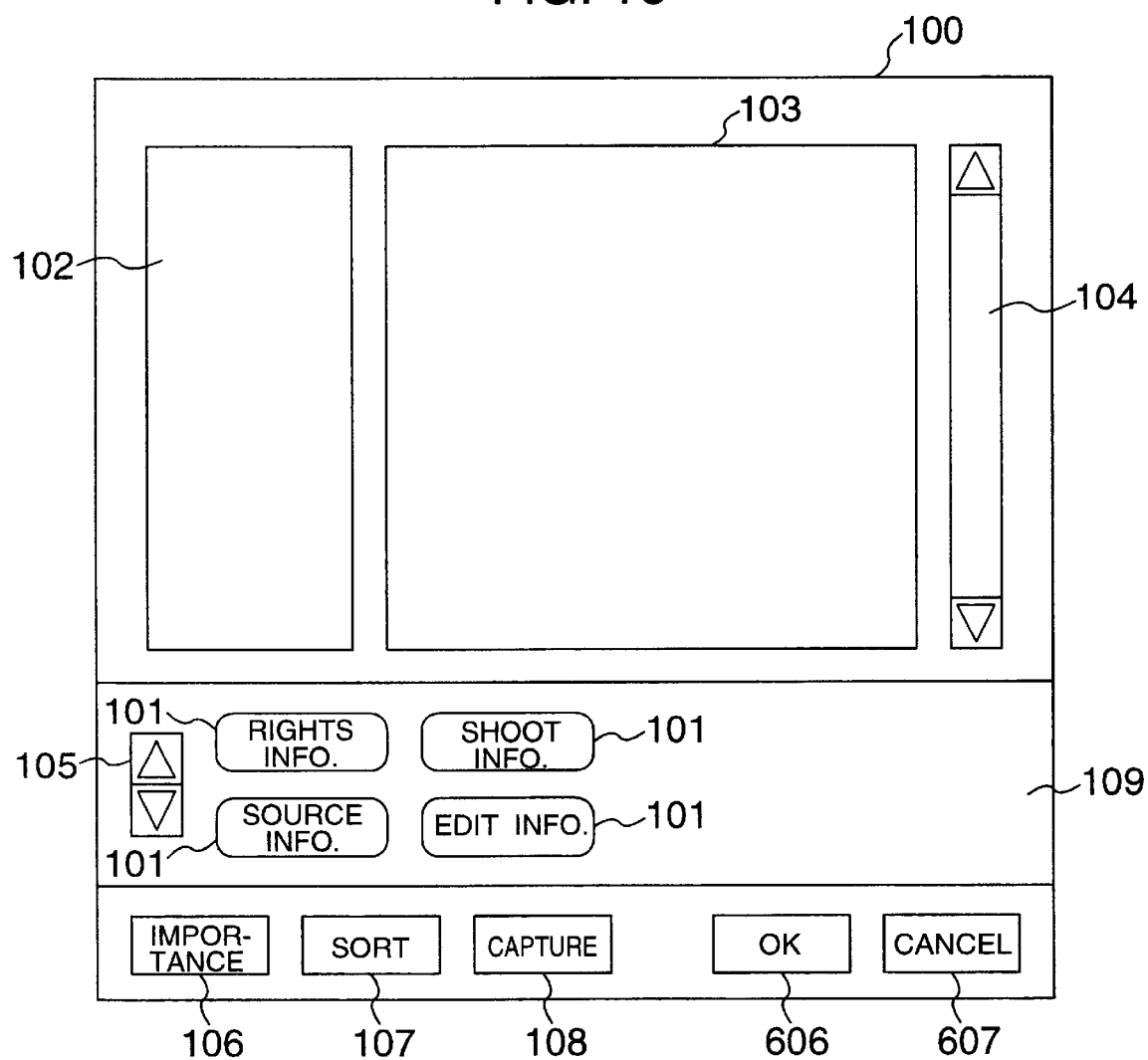
FIGS. 16 to 21 show other examples of the information window respectively.
Figure 17:
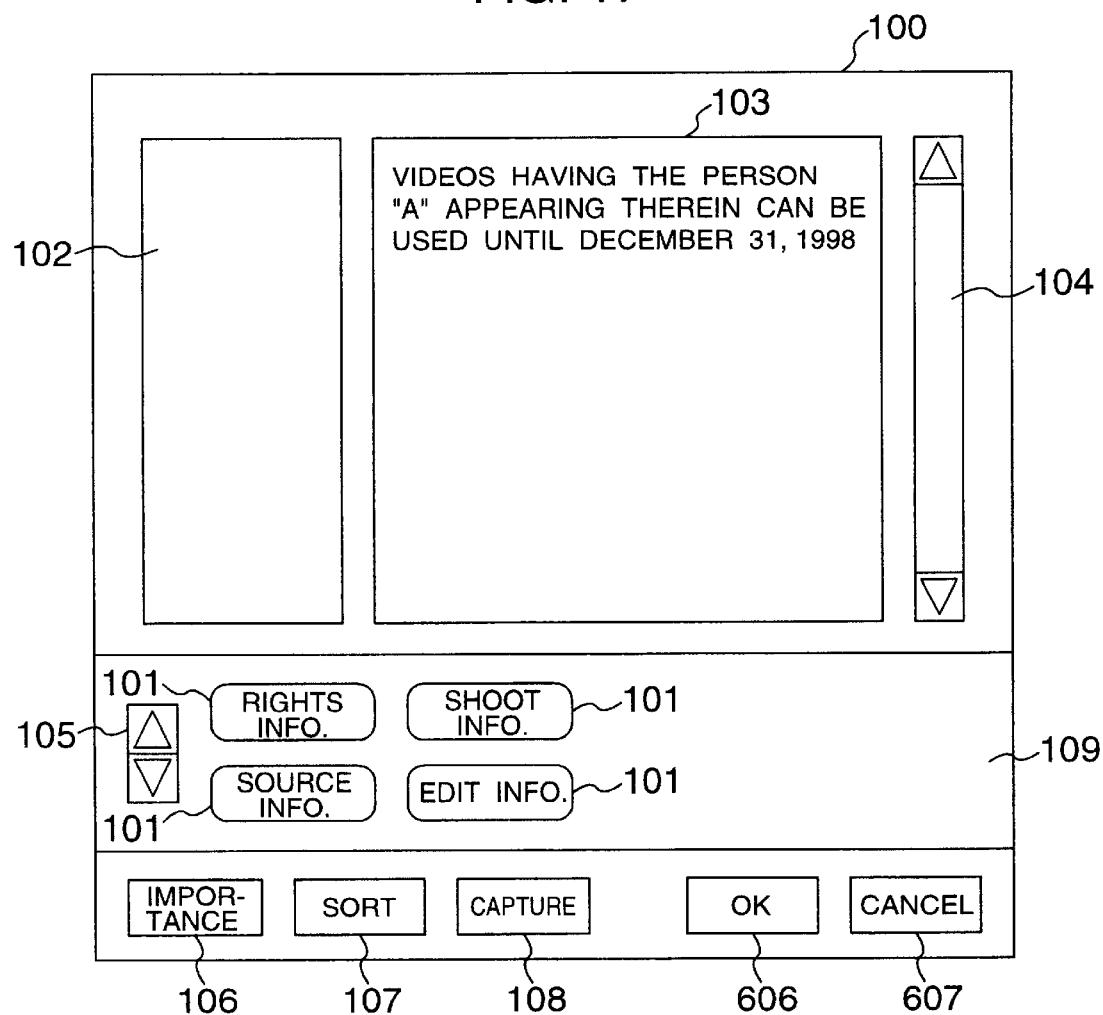
Figure 18:
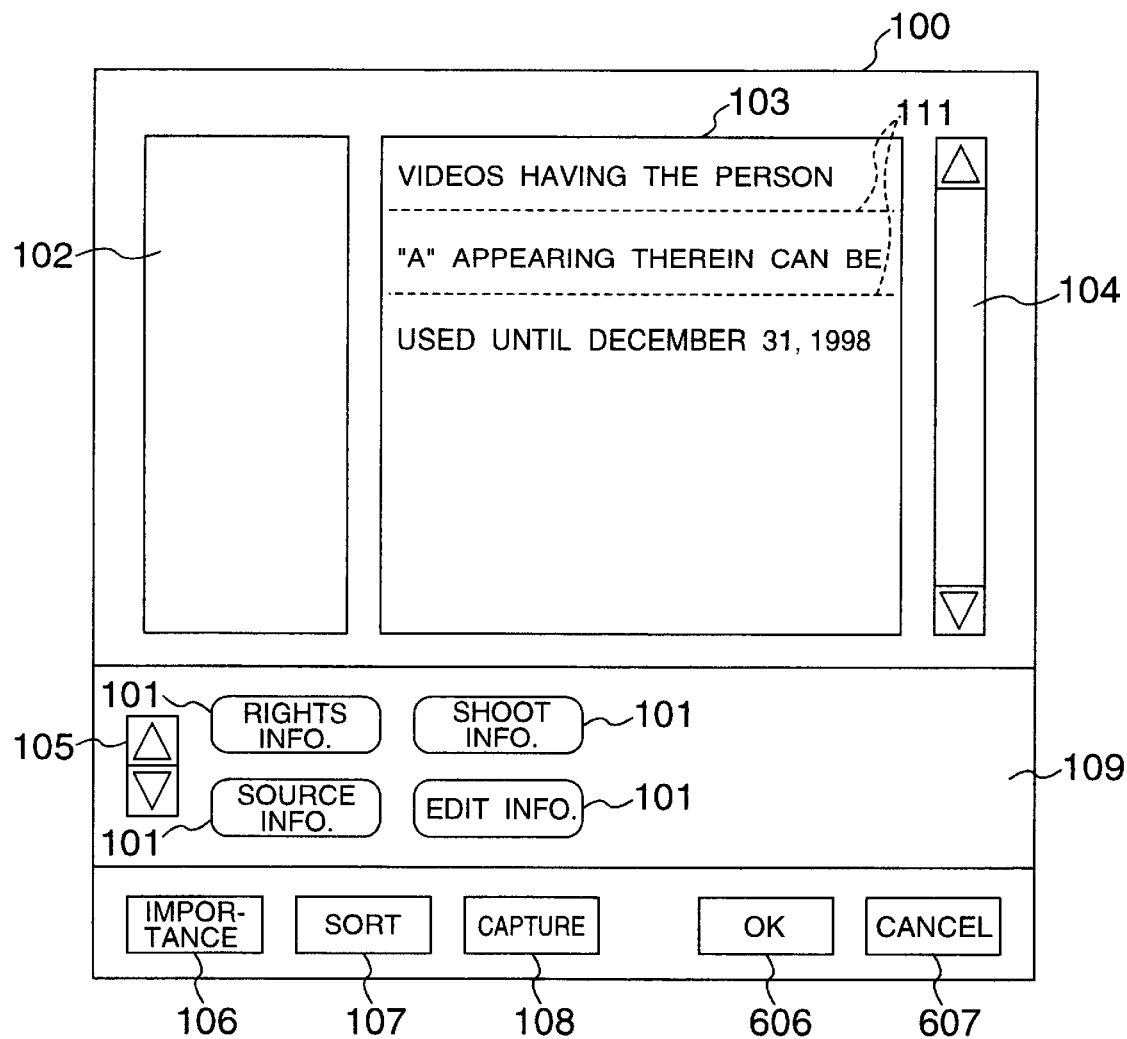
Figure 19:
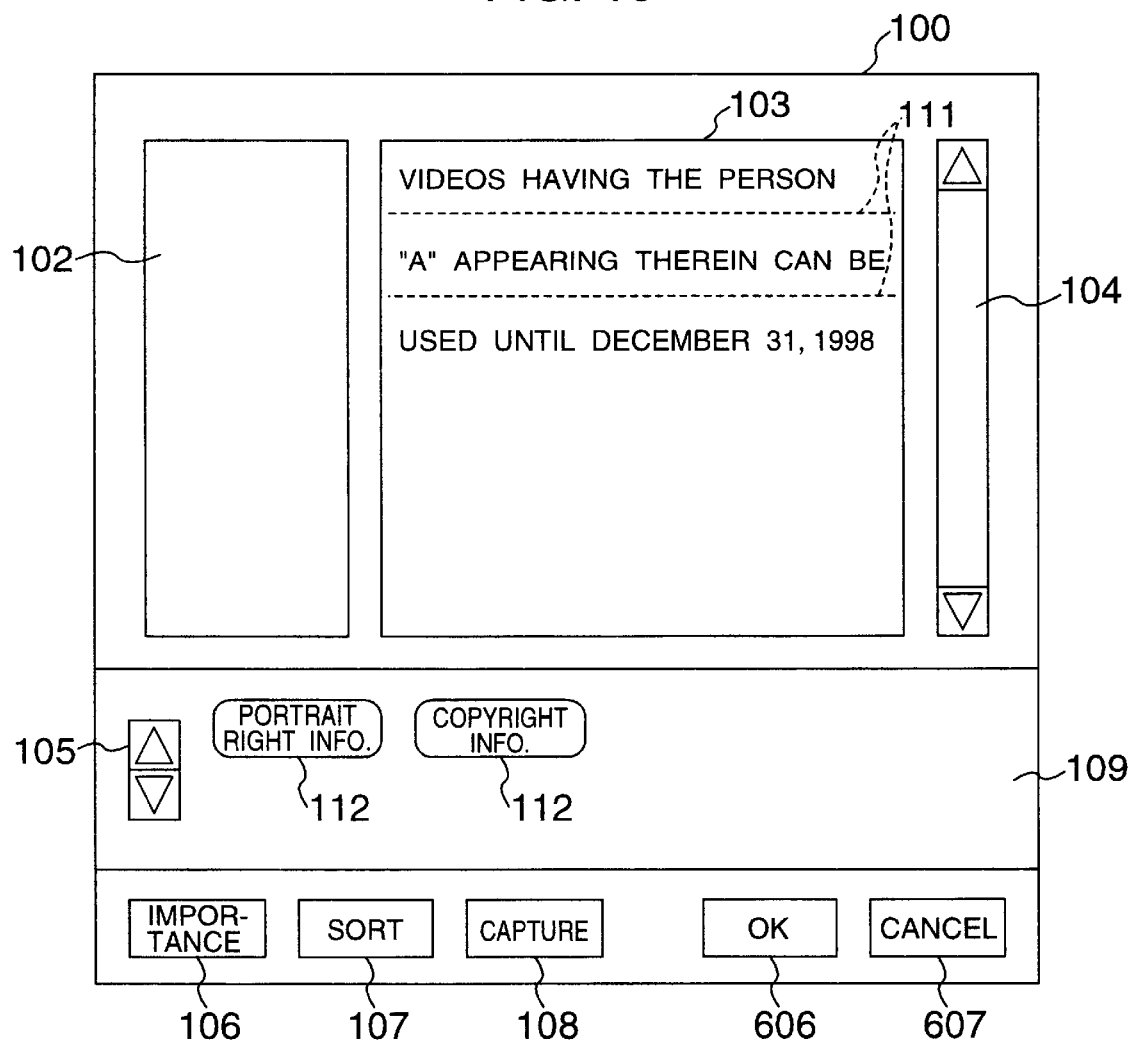
Figure 20:
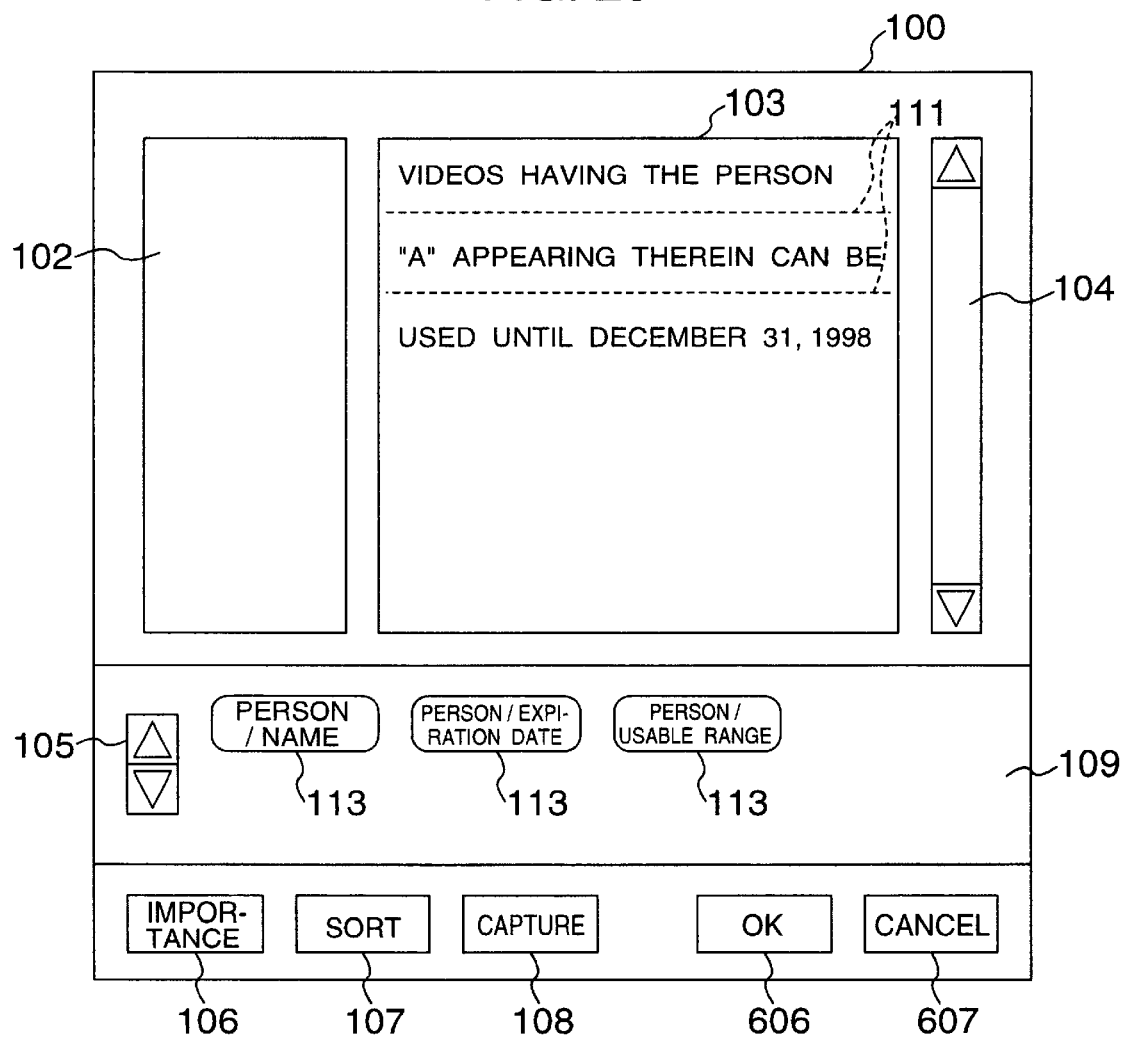
Figure 22:
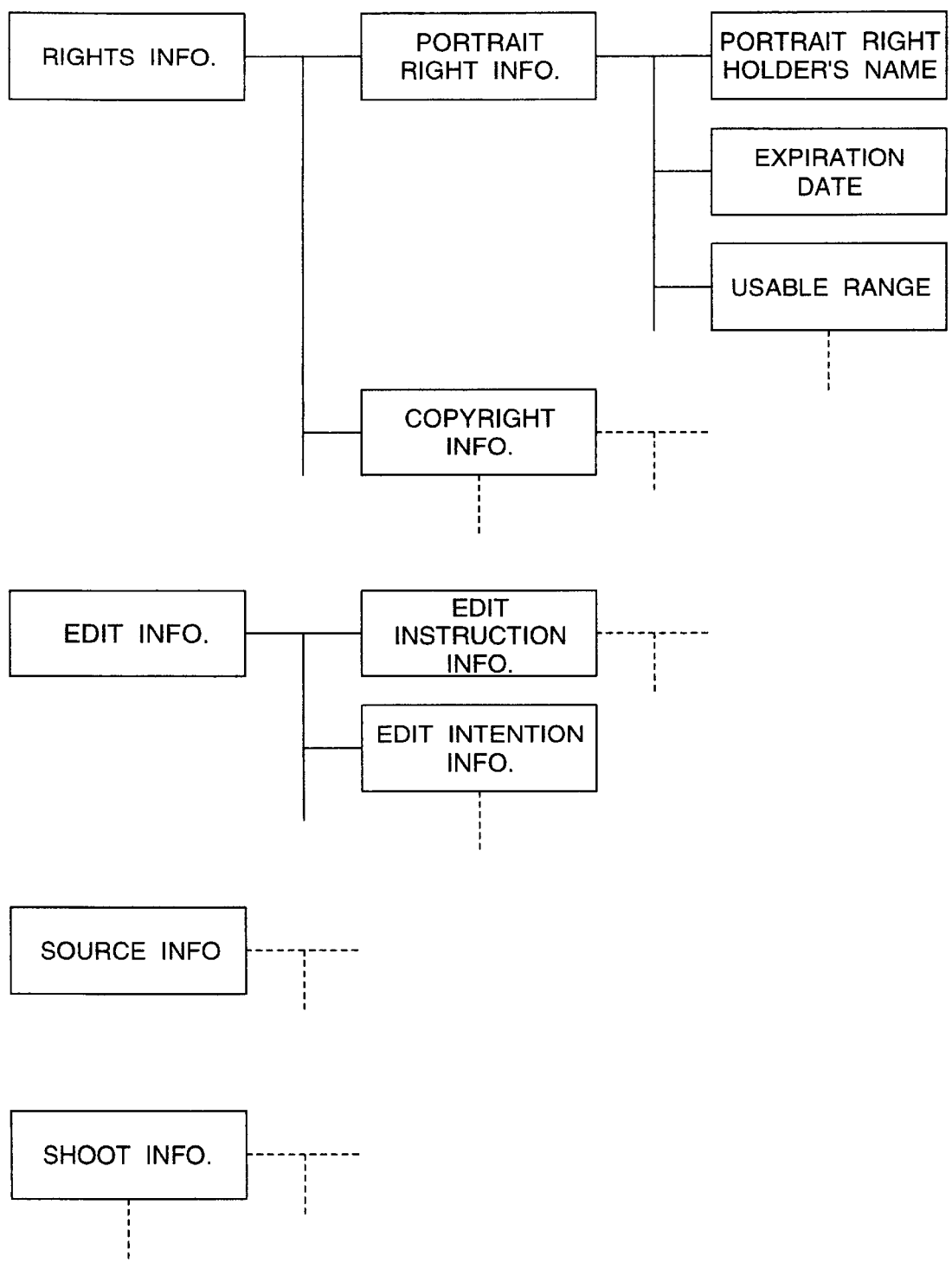
FIG. 22 shows an exemplary hierarchical structure in the present invention.

In FIG. 16, with the information window 100 called, the operator first enters transmitted information with use of such an input device 206 as a keyboard. In this example, the operator enters "videos having the person A appearing therein can be used until Dec. 31, 1998". This causes appearance of such a display screen as shown in FIG. 17. The operator next enters a return at the head and tail of a character string which he wants to use as information in the entered sentence with use of the input device 206 to extract the character string from the entire sentence. In the present example, the operator enters a return at the head and tail of the character string of "Dec. 31, 1998". This causes appearance of such a screen as shown in FIG. 18. As will be seen from FIG. 18, extraction statement lines 111 are indicated at upper and lower sides of the extracted character string for clearly showing that the character string was extracted. The operator then selects a corresponding information item tag from a group of tag buttons of the information item tags 101. These information item tags are stored in the form of such a hierarchical structure as shown in FIG. 22. FIG. 22 shows an example of the hierarchical structure of the information item tags in the present invention. The operator switches to an information item tag to be displayed, by clicking the mouse on the change-over button 105 to move between the layers. In the present example, the operator clicks the mouse on the information item tag 101 of "rights information" in FIG. 18 to put the tag in its selected state, and then clicks the mouse on a downward arrow part of the change-over button 105. This causes the information item tag buttons 101 of "rights information", "shoot information", "source material information" and "edit information" to be changed to tag buttons 112 of "portrait right information" and "copyright information" in a layer lower than the layer of "rights information" in the hierarchical structure of FIG. 22, as shown in FIG. 19. The operator further puts the information item tag 112 of the "portrait right information" in its selected state, and similarly clicks the mouse on the downward arrow part of the change-over button 105. This, as shown in FIG. 20, causes appearance of information item tags 113 of "portrait/name" indicative of "portrait right holder's name", of "portrait/expiration date" indicative of "use expiration date" and of "portrait/usable range" indicative of "portrait usable range" in a layer lower than the layer of "portrait right information" of FIG. 22.

Figure 21:
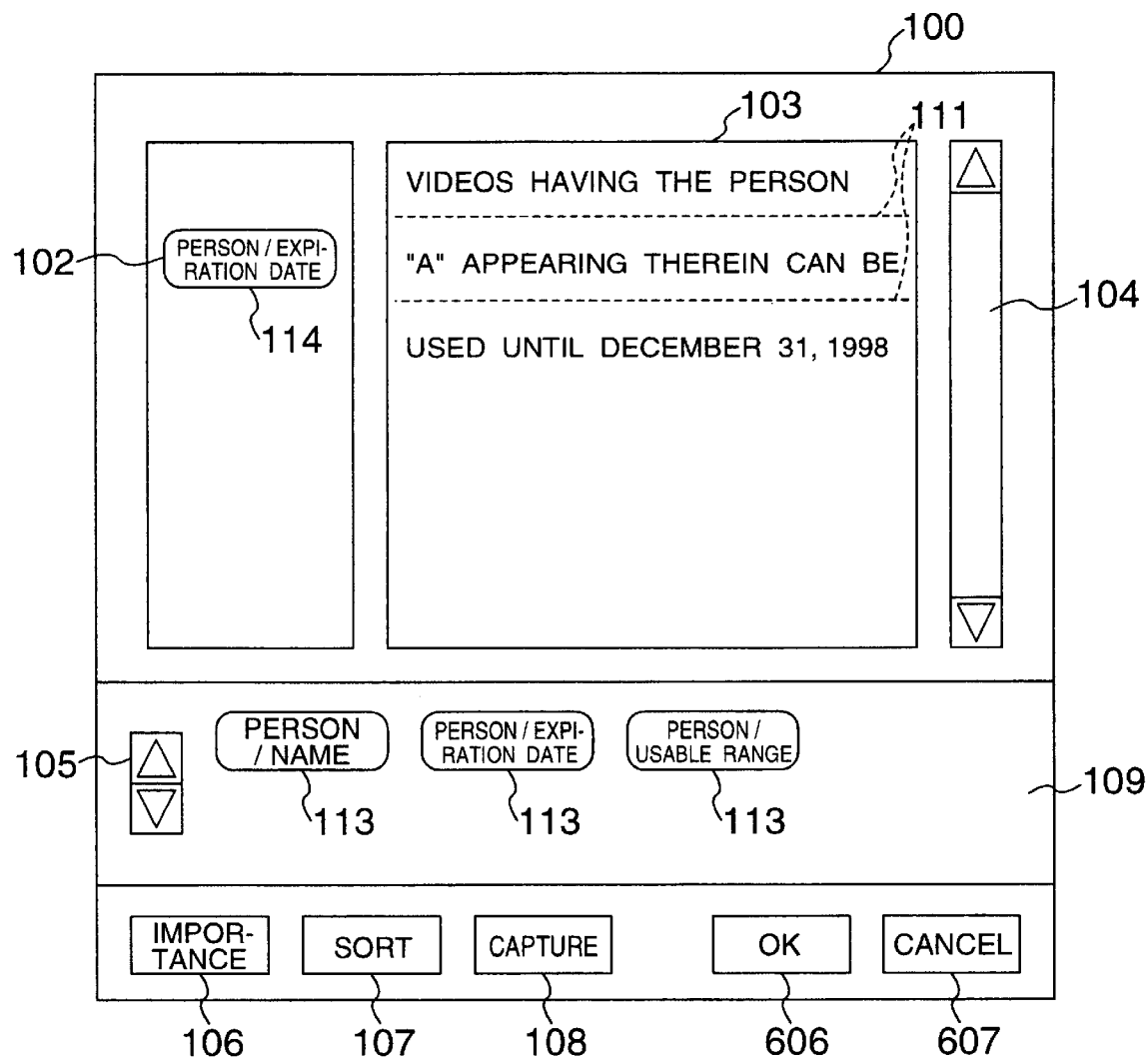

The operator drags the information item tag 113 of "portrait/name" into the tag pasting area 102 at a position at the direct left side of the above extracted character string. This, as shown in FIG. 21, causes appearance of a copy 114 of the dragged information item tag 113 at the left side of the desired character string.

Further, when it is desired to link a character string "person A" in the already-entered sentence of "videos having the person A appearing therein can be used until Dec. 31, 1998" as portrait right holder name information, this can be realized by the operator extracting the character string from the sentence, selecting the information item tag 113 of "portrait/name", and conducting drag & drop operation over it in the same manner as in the above.

When the number of pieces of information exceeds a predetermined value and the information cannot be displayed in a single display screen, the display range is scrolled by operating the scroll bar 104 with use of the mouse. Even when it is impossible to display the tag buttons 101, 112 and 113 in the tag button area 109 at a time, the display range can be scrolled by operating a scroll bar (not shown). The hierarchical structure of FIG. 22 shows an example of necessary video associated information and partly omits parts required for the explanation therein.

With a given information item tag selected, operator's click of the mouse on the importance setting button 106 enables setting of its importance of the associated information. When the information item tag is set to have a high importance, the color, font, contour, etc. of the tag is changed, whereby the operator can see its importance at a first glance.

The sort button 107 is used to change the display order of already added information. Operator's click on the sort button 107 to issue an instruction to arrange the information in an order of importance, this causes the information to be displayed as arranged from the upper side of the screen to the lower side thereof according to the information importance. Operator's instruction to arrange and display rights-associated information alone causes only rights-associated information to be found from the added information and displayed. This is a means for effectively finding important and/or specific information.

The operator has entered the first sentence of "videos having the person A appearing therein can be used until Dec. 31, 1998" from the keyboard in the above example. However, when the sentence is previously given in the form of a text file, the operator clicks the mouse on the input button 108 to issue an instruction to input the text file. This results in that the text appears on the information column 103.

When it is desired to change the information item of the already added information, this can be realized by dragging a new information item tag and drops it on the information item tag to be changed.

When it is desired to invalidate the already added information, the operator drags the information item tag and drops it into an area outside the tag pasting area 102.

Attributes such as the number of information item tags and item contents and the hierarchical structure can be arbitrarily set on the moving picture editing apparatus by a user on the production spot.

Finally, when it is desired to determine the associated information as valid information and close the window, the operator clicks the mouse on the OK button 606. When it is desired to determine the associated information as invalid information and close the window, the operator s click the mouse on the cancel button 607.

At the first stage, there may be considered various types of sorting methods. For example, it is considered that it is desired not to finely divide the sentence of "videos having the person A appearing therein can be used until Dec. 31, 1998" but to link it as a single piece of information, or that it is desired to roughly add information as a first step and later to finely add it. In such a case, it is also possible to regard the entire sentence as a single extraction and to temporarily add the information item tag 101 as an information item tag in the layer higher than the layer of information item tag 113 to it.

The present invention is used, further when it is desired to provide an idle tag button not belonging to any information items as an information item tag (not shown) to roughly add information to it as a first step and later to finely add thereto because of a difficulty of its information sorting.

Although the entire sentence of "videos having the person A appearing therein can be used until Dec. 31, 1998" has been entered in this example, only the part "Dec. 31, 1998" thereof may be entered from the beginning when it is previously known to use only the use expiration information.

In the foregoing embodiment, in order to extract a desired part from the information character string in the information column 103, divide it into line parts and then allocate the divided parts to video information genres; the target information item tag buttons have been dragged and dropped. As an alternative, however, it is also possible to select a necessary part in the sentence in the information column 103 with use of the mouse, and to drag the selected character string onto the target information item tag button to realize its allocation and display.

In these years, internet world (typical one of which is world wide web (WWW)) has spread remarkably, and diverse information has appeared in WWW pages and net news groups in the internet world.

In the foregoing embodiment, further, explanation has been made that the use of the multimedia icon enables input of multimedia information as video related information through internet communication. However, the above method requires that information obtained from the internet be once input into the moving picture editing apparatus. Further, when the input information is always updated at its input destination, it is necessary to again input the updated information through the network communication.

Since the internet is spread and networking is advanced, it becomes possible to offer the aforementioned video related information in the form of a www page through the internet. Further, since www page format can be commonly used for most computers having different operating systems (OSs), the management database per se of the video related information can be changed to the www page format. When information of the www page format can be referred to on the editing apparatus through the network, the need for needless works of reconnecting the apparatus to the network to input the information into the apparatus can be eliminated, thus increasing its editing efficiency.

Figure 23:
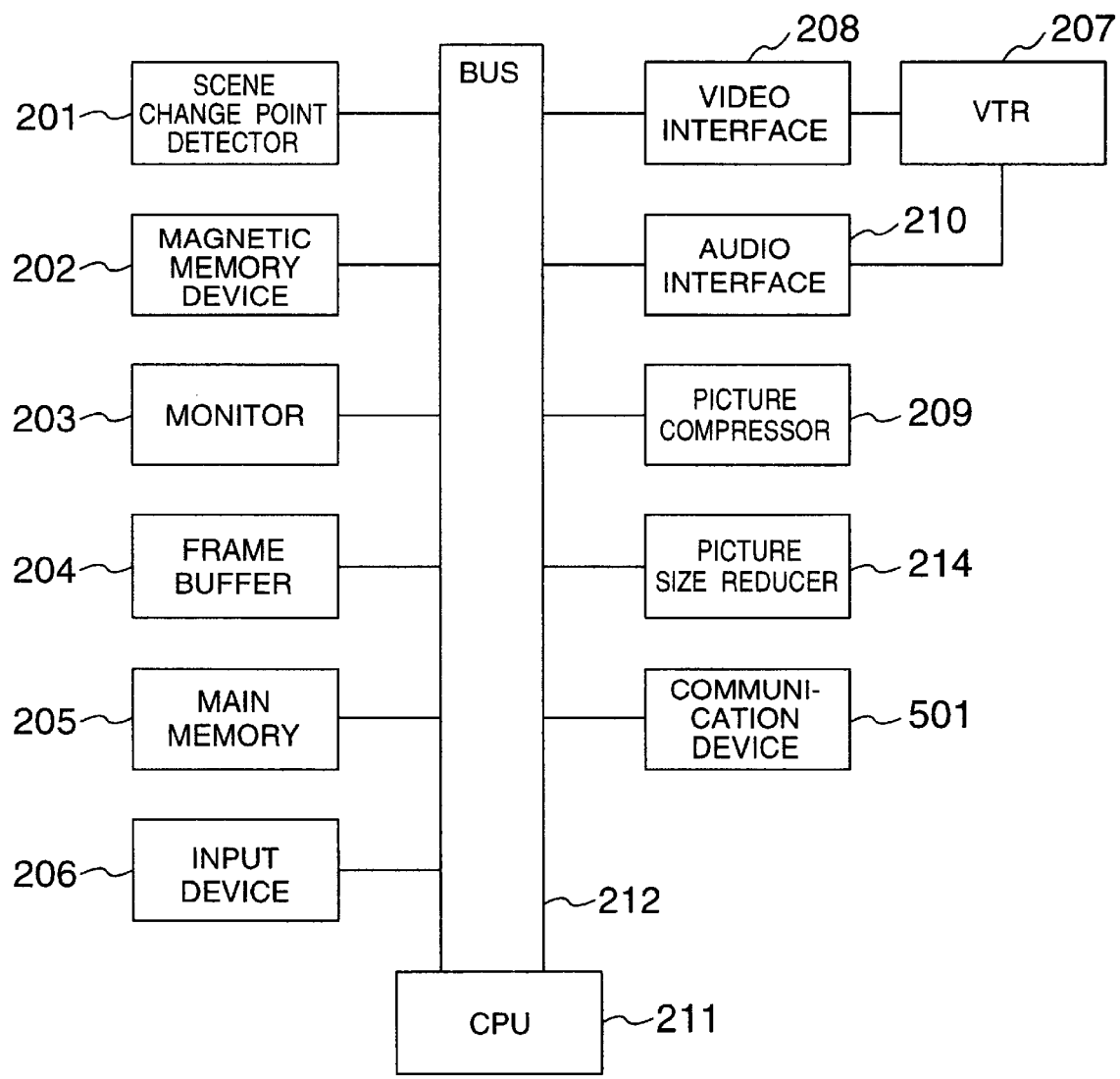
FIG. 23 is a block diagram of an arrangement of the moving picture editing apparatus in accordance with an embodiment of the present invention.
Figure 24:
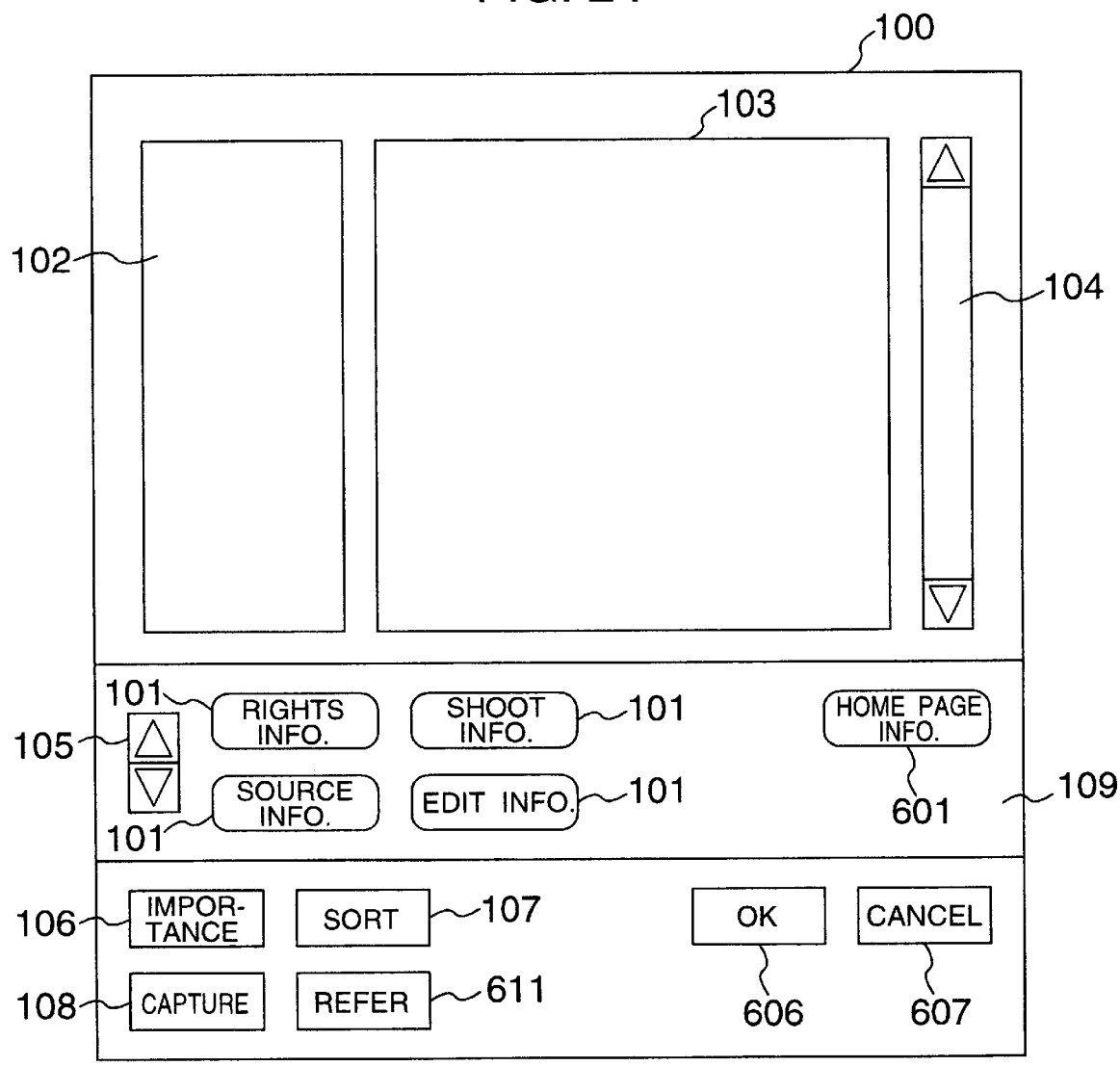
FIGS. 24 to 29 show other examples of the information window respectively.

Explanation will then be made as to an embodiment of inputting www page information by referring to FIGS. 23 to 29 and 9. FIG. 23 is a block diagram of an arrangement of the moving picture editing apparatus in accordance with an embodiment of the present invention, which corresponds to the arrangement of FIG. 2 but is added by the communication device 215. The apparatus is connected to another computer or network line through the communication device 215 to input internet information into the apparatus. Usable as the communication device 215 is an Ether Net interface allowing information transfer between another computer or external network and the moving picture editing apparatus, an asynchronous transfer mode (ATM) interface, a modem, a facsimile machine, a telephone set or another communication terminal. FIGS. 24 to 29 show other examples of the information window, in which blocks having the same functions as those in FIGS. 16 to 21 are denoted by the same reference numerals. In the drawings, reference numeral 610 denotes a www page information tag, numeral 611 denotes a www page reference button, 612 denotes an address setting window, 613 denotes an address list column, 614 denotes a selected address column, 615 denotes a confirmation button, 616 denotes an OK button, 617 denotes a cancel button, 618 denotes a scroll bar, and 619 denotes a mouse cursor.

First of all, explanation will be made as to how to link www page information offered in a www page format to a miniature moving images and how to refer it.

As a specific example of the method for linking www page information to a miniature moving image, explanation will be made in connection with a case where information about a person (Taro) appearing in a cut of the M-icon 302 in FIG. 9 is present in a www page introducing the profile of the person as www page information and the www page has an address of "http://www.taro.or.jp", as to how to link the www page information to the M-icon 302.

Figure 25:
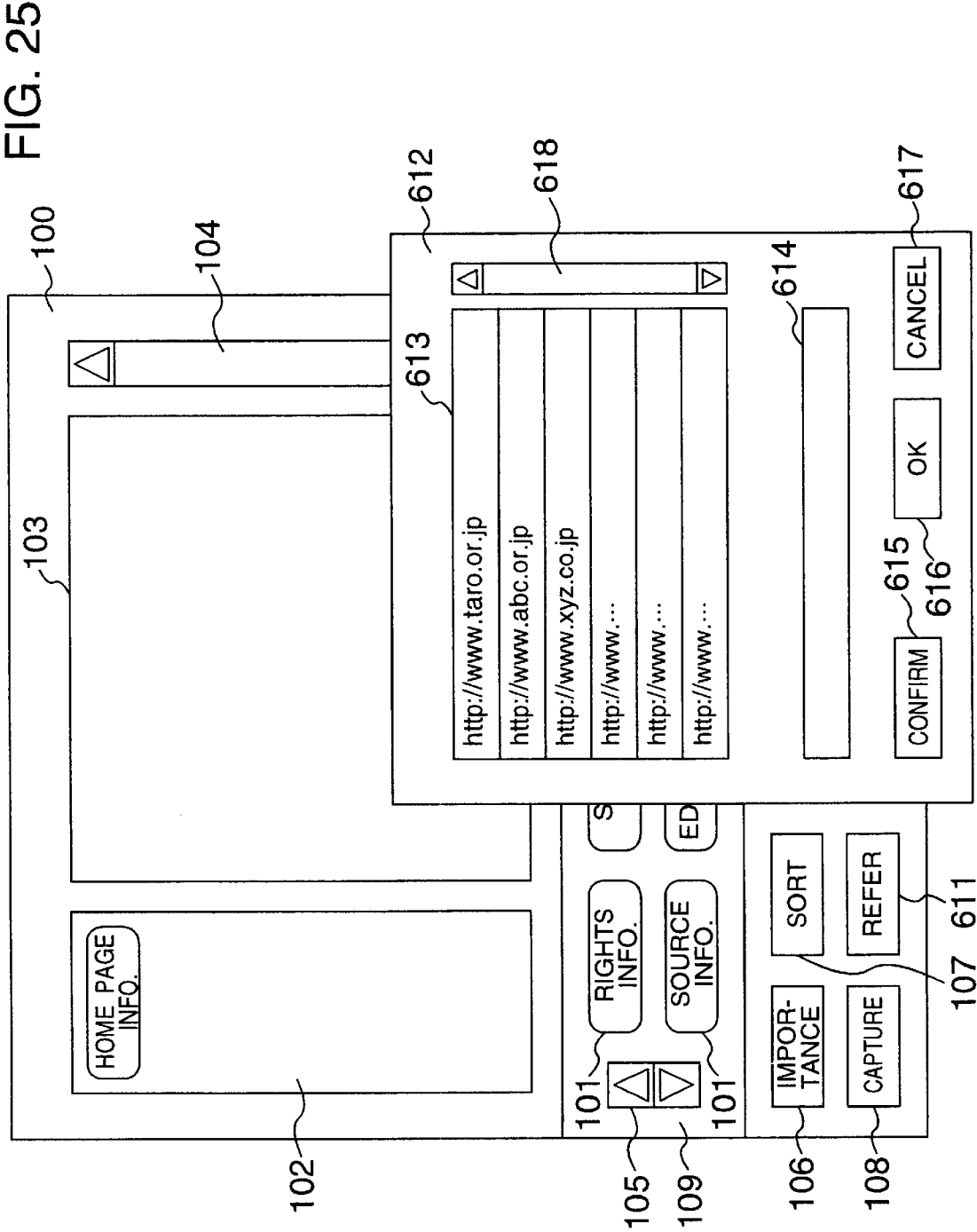

The operator clicks the mouse as the input device 206 on the M-icon 302 to put the icon in its selected state, and then clicks on the information button 321 in the group of various function buttons 305. This causes appearance of the aforementioned information window 100 (see FIG. 24). With the information window 100 is displayed, the operator drags the www page information tag 610 with use of the mouse of the input device 206 and drops it into the tag pasting area 102. As a result, the www page information tag 610 is pasted at the dropped position. If there is no information description in the information column 103 at a right side of the pasted www page information tag 610, then the address setting window 612 appears to inquire its address as shown in FIG. 25.

The address list column 613 displays a list of addresses referred to in the past. When there is one of the www page addresses being currently referred to in the list, the operator select it with the mouse. In this example, the operator selects "http://www.taro.or.jp" as its target address. The number of addresses displayable in the address list column 613 at a time is 6 in the example of FIG. 27. However, when 7 or more addresses are recorded in the past and the operator cannot see all in the address list column 613, the operator can operate the scroll bar 618 to select target one of the addresses. This causes the selected address to appear in the selected address column 614 (see FIG. 26). If the operator fails to find the target address of the www page in the address list column 613, the operator enters the target address in the selected address column 614 with use of the keyboard as the input device 206 (see FIG. 27). In this example, the operator enters "http://www.taro.or.jp".

Figure 26:
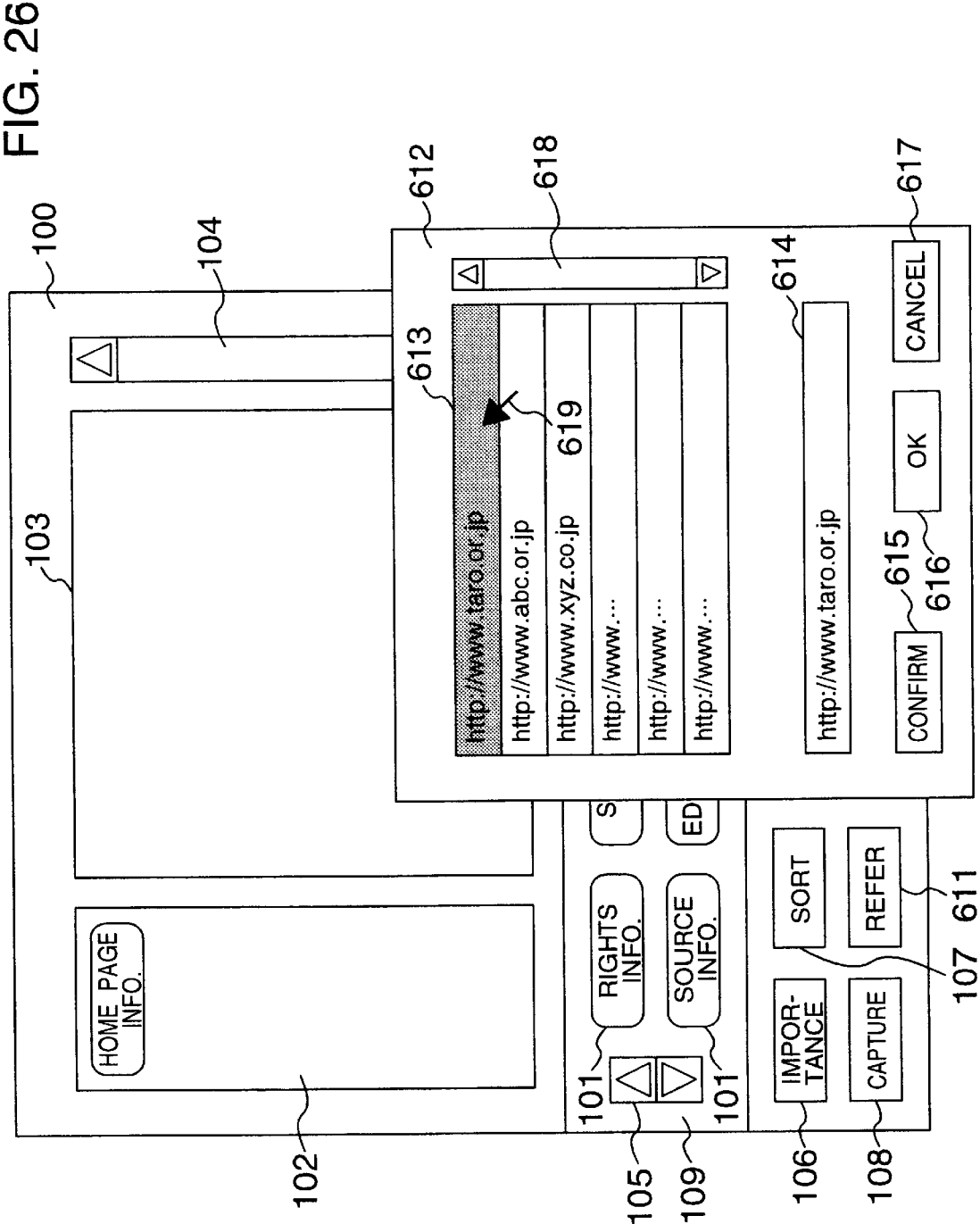
Figure 27:
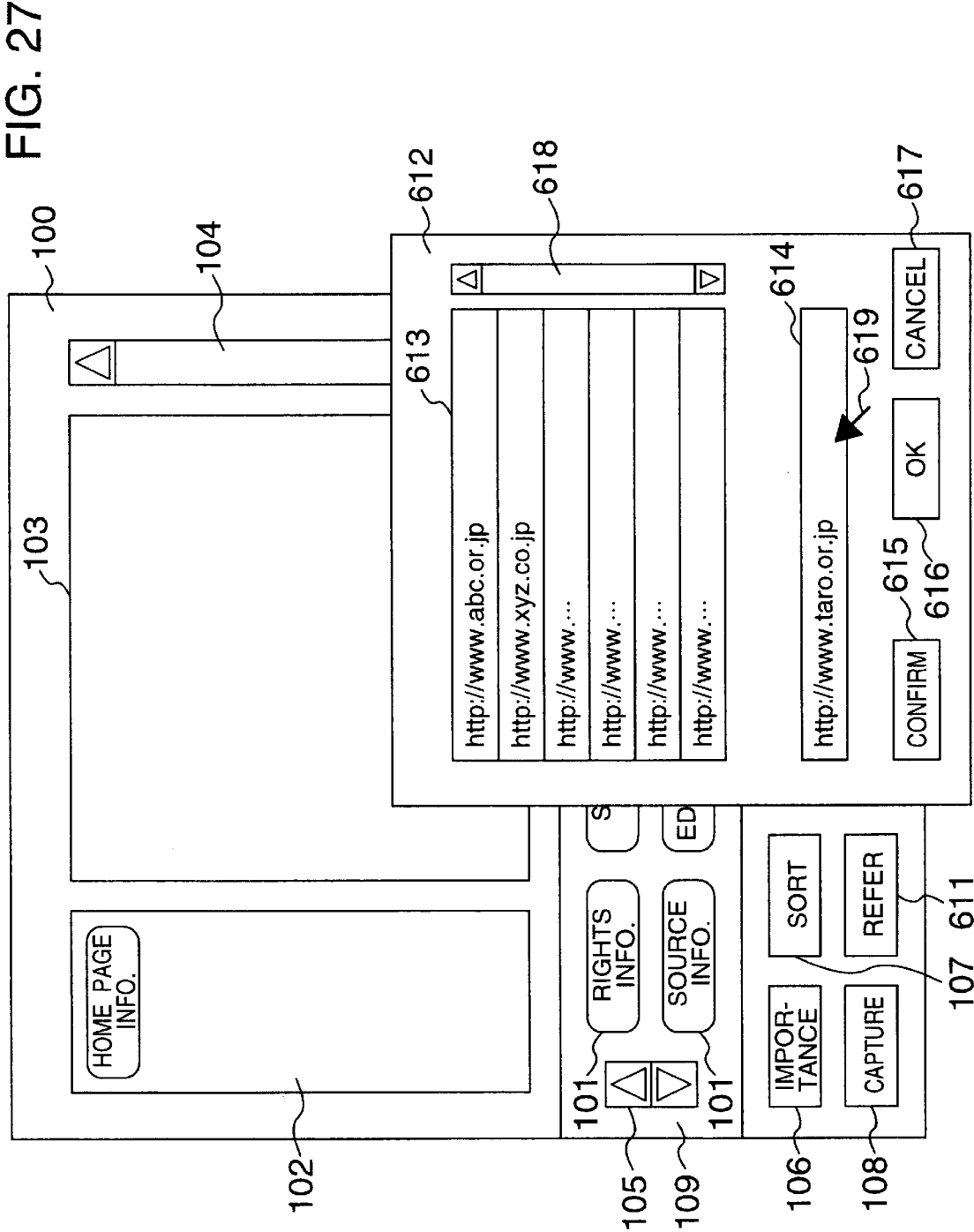

With such a condition as shown in FIG. 26 or 27, when the operator clicks on the confirmation button 615, the apparatus starts to access the address shown in the selected address column 614 through the communication device 215 and to display obtained information with the help of an external application program designed for www page. (For example, the www page of the selected address accessed by an external application program is displayed on the monitor 203.) The external application is, for example, an Netscape Navigator developed by Netscape Communications Corporation, or an Internet Explorer developed by Microsoft Corporation. Selection of such external application programs can be freely done by switching between the settings of the moving picture editing apparatus.

When the operator confirms the contents of the information displayed by the www page external application and judges that the www page of the selected address offers the desired information, he clicks on the OK button 616 to validate the set contents, add the address to the list of addresses referred to in the past and close the address setting window 612. Further, operator's click on the cancel button 617 causes the set contents to be made invalid to thereby close the address setting window 612.

As has been mentioned above, in this example, the operator enters the www page address of "http://www.taro.or.jp" in the information window 100 as www page information.

Further, when the operator drops the www page information tag 610 in the tag pasting area 102 and a description of the www page address is given at a corresponding position in the information column 103, the description of the www page address is set as an address.

Figure 28:
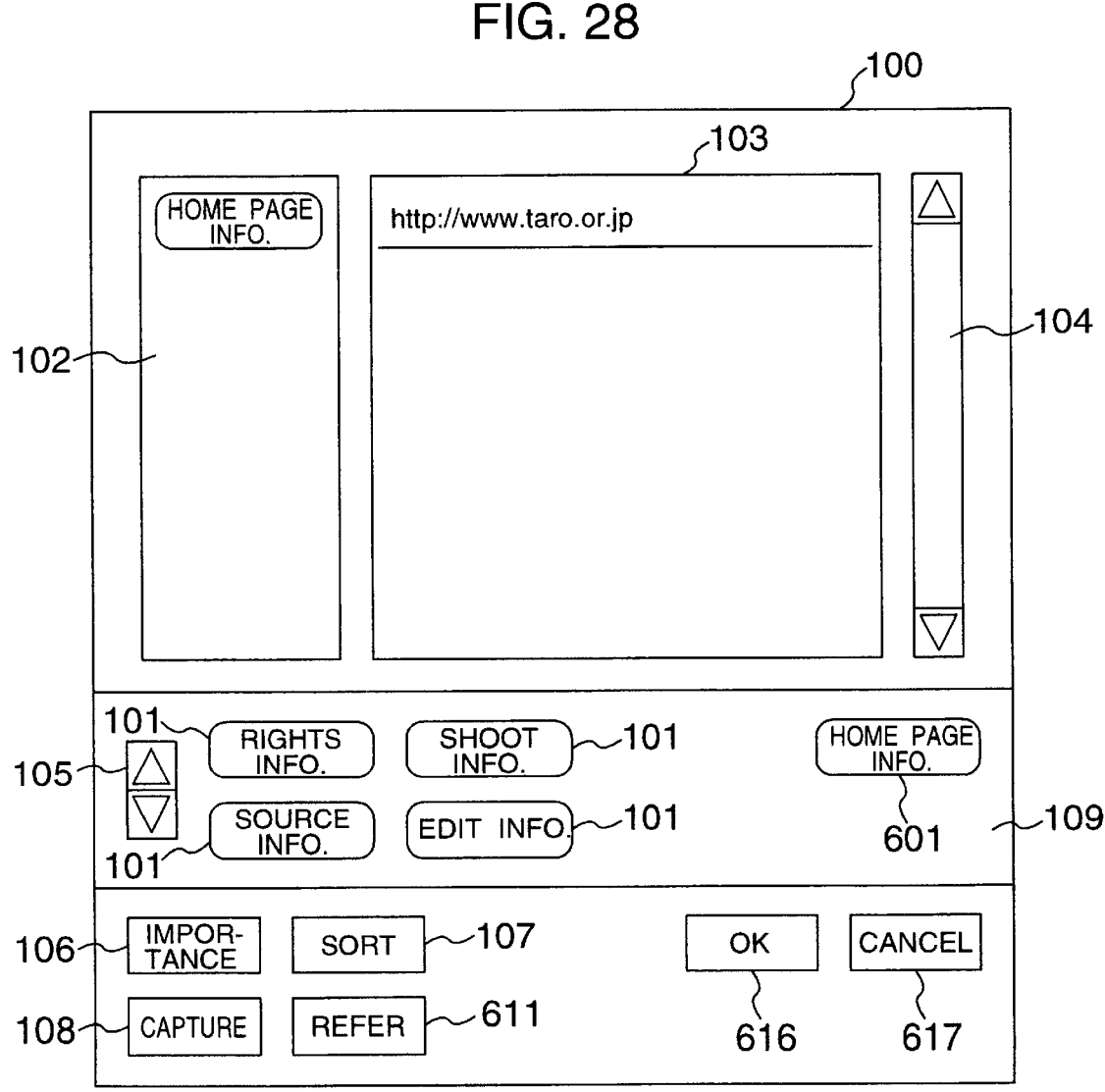

This operation as viewed from the side of the apparatus will be explained as a flow of operation with use of flowcharts of FIGS. 30 and 28 showing an example of how to set the www page information.

The operator first selects a desired M-icon (such as the M-icon 302) in the hierarchical structure area 301 on the editing screen 300 of FIG. 1 and clicks on the information button 321. This causes the CPU to display the information window 100 (see FIG. 24) on the monitor 203 (step 901) and to proceed to a step 902. Under this condition, the CPU waits for an interrupt input from the mouse or keyboard as the input device 206. When accepting the interrupt input, the CPU proceeds to a step 903 (step 902). In the step 903, the CPU is branched depending on whether or not the mouse was clicked on the OK button 606. That is, a click on the OK button causes the CPU to go to a step 904, while no click on the OK button causes the CPU to go to a step 905. In the step 904, the CPU validates the set contents and then closes the information window 100 (end of processing). In the step 905, the CPU judges which of the information item tags 100, 112 and 113 was dragged by the mouse. When determining that any of the information item tags 100, 112 and 113 was not dragged by the mouse, the CPU regards the interrupt input generated at this time as invalid and returns to the step 902 to waits for a next interrupt input. When determining that any one of the information item tags 100, 112 and 113 was dragged by the mouse, the CPU proceeds to a step 906 (step 905). In the next step 906, the CPU judges whether or not any of the information item tags 100, 112 and 113 was dragged into the tag pasting area 102, and the CPU is put in a loop condition until the CPU determines that the any of the information item tags 100, 112 and 113 was dropped. At the time of determining that any of the information item tags 100, 112 and 113 was dropped, the CPU goes out of the loop and proceeds to a next step 907 (step 906). In the step 907, the CPU judges whether or not the dropped position of the information item tag is within the tag pasting area 102. When determining that the dropped position is out of the tag pasting area 102, the CPU regards the interrupt input at this time as invalid and returns to the step 902 to wait of a next interrupt input. When determining that the dropped position is within the tag pasting area 102, the CPU proceeds to a step 908 (step 907). In the step 908, the CPU displays the information item tag dropped within the tag pasting area 102 in the step 907 as pasted within the tag pasting area 102, and goes to a step 909. In the step 909, the CPU judges whether or not the information item tag pasted within the tag pasting area 102 is the www page information tag 610. If the information item tag is not the www page information tag 610, then the CPU returns to the step 902 to wait for a next interrupt input. When determining that the information item tag is the www page information tag 610, the CPU proceeds to a step 910 (step 909). In the step 910, the CPU judges whether or not some information is already described in the information column 103 at a position corresponding to the www page information tag 610 pasted within the tag pasting area 102. If some information is described, then the CPU proceeds to a step 911. If not, then the CPU proceeds to a step 912 (step 910). In the step 911, the CPU stores its description contents and returns to the step 902 to wait for a next interrupt input. When determining in the step 910 some information is not described, the CPU goes to the step 912 (step 911). In the step 912, the CPU displays the address setting window 612 on the monitor 203 and goes to a step 913 in FIG. 28 (step 912).

In the step 913, the CPU waits for an interrupt input from such an input device 206 as the mouse or keyboard. Generation of an interrupt input causes the CPU to proceed to a step 914 (step 913). In the step 914, the CPU judges whether or not an address was selected from the address list column 613 by the mouse. When an address was selected, the CPU goes to a step 915. When an address was not selected, the CPU goes to a step 916 (step 914). In the step 915, the CPU displays the selected address in the selected address column 614 and returns to the step 913 (step 915). In the step 916, the CPU judges whether or not the address was input directly from the keyboard into the selected address column 614. When determining that the address was input directly into the selected address column 614, the CPU proceeds to a step 917. When determining that no address is input to the selected address column 614, the CPU proceeds to a step 918 (step 916). In the step 918, the CPU judges whether or not the mouse was clicked on the confirmation button 615. When determining that the mouse was clicked on the confirmation button 615, the CPU goes to a step 919. When determining that the mouse was not clicked on the confirmation button 615, the CPU goes to a step 921. In the step 919, the CPU judges whether or not an address is indicated in the selected address column 614. When an address is indicated in the selected address column 614, the CPU goes to a step 920. If not, then the CPU returns to the step 913 (step 919). In the step 920, the CPU starts an external application program to access the address shown in the selected address column 614 and to display an obtained www page on the monitor (step 920).

In the next step 921, the CPU judges whether or not the mouse was clicked on the OK button 616. Determination of a click on the OK button 616 causes the CPU to go to a step 922. Determination of no click on the OK button 616 causes the CPU to proceed to a step 925 (step 921). In the step 922, as in the step 919, the CPU judges whether or not an address is shown in the selected address column 614. When an address is given in the selected address column 614, the CPU proceeds to a step 923. If not, then the CPU returns to the step 913 (step 922). In the step 923, the CPU stores the indication contents of the selected address column 614 as an www page address and proceeds to a step 924 (step 923). In the step 925, the CPU judges whether or not the mouse was clicked on the cancel button 617. When determining a click of the mouse on the cancel button 617, the CPU proceeds to a step 924. When determining no click on the cancel button 617, the CPU returns to the step 913 (step 921). In the step 924, the CPU closes the address setting window 612 and returns to the step 902 in FIG. 30.

Explanation will then be made as to how to refer to the www page.

As a result of settings already explain in FIGS. 1, 23 to 27, 30 and 28; the information window 100 is as shown in FIG. 28. This means that the www page information of "http://www.taro.or.jp" is associated with (e.g., linked to) the M-icon 302 in FIG. 1. Under this condition, the operator first clicks the mouse on the pasted www page information tag 610. This causes the www page information tag 610 to be put in its selected state, which is clearly shown by a red frame, indicating that the tag is selected. Under this condition, when the operator clicks the mouse on the www page reference button 611, the CPU starts to access the set address and display obtained www page information under the external application program. (For example, the external application program is started and the www page of the selected address is displayed on the monitor 203.) Termination of the display is carried out by terminating the external application program. Finally, a click of the mouse on the OK button 606 causes the CPU to validate the information linked on the information window 100, store the M-icon 302 in the hierarchical structure of FIG. 1 and the linked information, and close the information window 100.

Even when the www page information of "http://www.whale.or.jp" is associated with the M-icon 308 in FIG. 1, the same method as the above is carried out. Further, when there is www page information to be linked to the entire scene such as the M-icon 307 as typical information, for example, when there is information which is common to all M-icons of the layer lower than the layer of the M-icon 307 in the hierarchical structure or which is high in abstraction degree; the operator selects the M-icon 307 to display the information window 100 and conducts the same procedures as in the above.

In such a manner as mentioned above, the www page information was linked to the M-icons 302, 308 and 307 respectively. When the operator wishes to again see the linked information, he selects the M-icon linked to the desired information with use of the mouse to issue an instruction to display it on the information window 100 in the similar way to the above, the information linked to the selected M-icon is displayed as shown in FIG. 28. Under such a condition that the M-icon 307 located in the layer higher than the layer of the M-icon 302 or 308 is selected with the mouse, when the operator issues an instruction to display the information window 100, all information contained in the layers lower than the layer of the M-icon 307 in the hierarchical structure are combined and displayed in the form of a list on the information window 100 (refer to FIG. 29). The method of FIG. 29 is valid when it is unclear to which the target information is linked. Even in the case of FIG. 29, a method for referring to a www page is the same as in the case of FIG. 28.

As has been explained above, in accordance with the present invention, since there can be provided a method for displaying video information in the form of a hierarchical structure, video related information can be finely managed in a centralized manner and loss of the related information can be avoided. Further, the formation of video information in a hierarchical structure enables fine information management according to the degree of abstraction of the video related information. Furthermore, the operator can quickly grasp related information associated with a target video source material during the editing operation and thus can easily confirm the detailed information. In addition, since its operating means is implemented with a simple interface, even an unexperienced user can operate the apparatus.

In accordance with the present invention, further, there is provided a method for accessing information of a www page format from the moving picture editing apparatus through the internet based on the structure of video information and linking the www page format information to the video information according to the structure of the video information. As a result, information useful to the video editor can be more easily obtained than the prior art and thus diverse editing can be realized and an editing efficiency can be increased.

What is claimed is:

1. An apparatus for editing moving picture, comprising;
   input means for inputting said moving picture and related information, said moving picture comprising a plurality of scenes, each scene comprising a plurality of cuts and each cut comprising a plurality of frame images;
   detecting means for detecting change points of said moving picture and dividing said moving picture into said scenes and cuts;
   selecting means for extracting a still image representing each of said scenes and cuts;
   a memory for storing said related information and the representative still images of said scenes and cuts, wherein said related information includes information concerning properties of a person associated with said scenes, cuts, frames and still images;
   means for designating said representative still images of said scenes and cuts to edit said moving picture;
   means for determining a hierarchical structure, said hierarchical structure comprising a plurality of layers in accordance with said scenes and cuts;
   means for displaying said hierarchical structure and said related information; and
   a controller for controlling said memory and said display means so that said related information in relation to said representative still images to be displayed is displayed with said representative still images.

2. An apparatus for editing moving picture according to claim 1, wherein said related information comprise a plurality of layers that are different degrees of abstraction, and said display means displays said representative still images and said related information of the layer in relation to said representative still images to be displayed.

3. An apparatus for editing moving picture according to claim 1, wherein said related information further includes information relating to contents of said still images and management information for management of said attribute information.

4. An apparatus for editing moving picture according to claim 1, wherein said display means further displays icons indicative of the related information on said display unit as associated with said representative still images.

5. An apparatus for editing moving picture according to claim 4, wherein said related information include information of at least any of character, video and audio formats.

6. An apparatus for editing moving picture according to claim 5, wherein said memory includes data areas for storing therein said related information as associated with said representative still images.

7. An apparatus for editing moving picture according to claim 6, wherein said memory includes data areas for storing therein information indicative of presence locations of said related information as associated with said representative still images.

8. An apparatus for editing moving picture according to claim 7, wherein said controller comprises means for accessing the presence location of said related information specified in said data areas of said memory by an instruction from an input device, reading out said related information from the memory and displaying the read-out related information by said display means.

9. An apparatus for editing a moving picture having a related information thereof comprising;
   input means for inputting said moving picture and said related information, said moving picture comprising a plurality of scenes, each scene comprising a plurality of cuts and each cut comprising a plurality of frame images;
   detecting means for detecting change points of said moving picture and dividing said moving picture into said scenes and cuts;
   selecting means for extracting a still image representing each of said scenes and cuts;
   a memory for storing said related information and the representative still images of said scenes and cuts;
   means for designating said representative still images of said scenes and cuts to edit said moving picture;
   means for determining a hierarchical structure, said hierarchical structure comprising a plurality of layers in accordance with said scenes and cuts;
   means for displaying said hierarchical structure and said related information; and
   a controller for controlling said memory and said display means so that said related information in relation to said representative still images to be displayed is displayed with said representative still images,
   wherein said display means further displays icons indicative of the related information on said display unit as associated with said representative still images,
   wherein said related information include information of at least any of character, video and audio formats,
   wherein said memory includes data areas for storing therein said related information as associated with said representative still images,
   wherein said memory includes data areas for storing therein information indicative of present locations of said related information as associated with said representative still images, and
   wherein said controller comprises means for accessing the present locations of an external related information specified in said data areas of said memory by an instruction from said input device through a communication path connected to said input means, reading out said related information from the memory and transferring the read-out related information by said display means.

10. An apparatus for editing moving picture according to claim 6, wherein said controller comprises means for reading out said related information from said data areas of said memory based on an instruction from said input device and displaying the read-out related information to said display means.

11. An apparatus for editing moving picture according to claim 1, wherein said controller further comprises means for detecting a frame image containing specific feature information and means for relating the related information input from said input means to the frame image containing said feature information.

12. An apparatus for editing moving picture according to claim 11, wherein said controller further comprises means for searching for the frame images and the related information stored in said memory and extracting the frame image containing said specific feature information therefrom.

13. An apparatus for editing moving picture according to claim 1, wherein said controller further comprises means for displaying an related information icon for specification of said related information and means for placing said related information icon on said representative still image with use of said input means to correspond the related information input from said input means to said representative still image.

14. An apparatus for editing moving picture according to claim 13, wherein said related information is multimedia information.

15. An apparatus for editing moving picture according to claim 13, wherein said controller further comprises means for displaying the representative still image associated with said related information as discriminatable from the other images.

16. An apparatus for editing moving picture according to claim 1, further comprising;

said designating means comprises means for displaying on a display unit said representative still image;

said determining means comprises means for selecting and positioning the representative image in said hierarchical structure on said display unit to editing the moving picture.

17. A method of editing moving picture, comprising the steps of;

inputting said moving picture and related information, said moving picture comprising a plurality of scenes, each scene comprising a plurality of cuts and each cut comprising a plurality of frame images;

detecting change points of said moving picture and dividing said moving picture into said scenes and cuts;

extracting a still image representing each of said scenes and cuts;

storing said related information and the representative still images of said scenes and cuts in a memory, wherein said related information includes information concerning properties of a person associated with said scenes, cuts, frames and still images;

designating said representative still images of said scenes and cuts to edit said moving picture;

determining a hierarchical structure, said hierarchical structure comprising a plurality of layers in accordance with said scenes and cuts;

displaying said hierarchical structure of said representative still images and said related information so that said related information in relation to said representative still images to be displayed is displayed with said representative still images.

18. A method of editing moving picture according to claim 17, wherein said related information comprise a plurality of layers that are different degrees of abstraction, said step of displaying includes the step of displaying said representative still images and said related information of the layer in relation to said representative still images to be displayed.

19. A method of editing moving picture according to claim 17, wherein said related information include attribute information relating to contents of said representative still images and information for management of said attribute information.

20. A method of editing moving picture according to claim 17, further comprising a step of displaying icons indicative of the related information on a display unit as associated with said representative still images.

21. A method of editing moving picture according to claim 20, wherein said related information include information of at least any of character, video and audio formats.

22. A method of editing moving picture according to claim 21, further comprising a step of storing therein said related information in data areas of said memory as associated with said representative still images.

23. A method of editing moving picture according to claim 22, further comprising a step of storing therein information indicative of presence locations of said related information in data areas of said memory as associated with said representative still images.

24. A method of editing moving picture according to claim 23, further comprising a step of accessing the presence location of said related information specified in said data areas of said memory by an instruction, reading out said related information from the memory and outputting the read-out related information to said display unit.

25. A method of editing moving picture having a related information thereof comprising the steps of;

inputting said moving picture and said related information, said moving picture comprising a plurality of scenes, each scene comprising a plurality of cuts and each cut comprising a plurality of frame images;

detecting change points of said moving picture and dividing said moving picture into said scenes and cuts;

extracting a still image representing each of said scenes and cuts;

storing said related information and the representative still images of said scenes and cuts in a memory;

designating said representative still images of said scenes and cuts to edit said moving picture;

determining a hierarchical structure, said hierarchical structure comprising a plurality of layers in accordance with said scenes and cuts;

displaying said hierarchical structure of said representative still images and said related information so that said related information in relation to said representative still images to be displayed is displayed with said representative still images, said method further comprising the step of:

displaying icons indicative of the related information on a display unit as associated with said representative still images, wherein said related information include information of at least any of character, video and audio formats, said method further comprising the steps of:

storing therein said related information in data areas of said memory as associated with said representative still images, storing therein information indicative of present locations of said related information in data areas of said memory as associated with said representative still images, accessing the present locations of said external related information specified in said data areas of said memory by an instruction provided through a communication path connected to a computer, reading out said related information from the memory, and transferring the read-out related information to said display unit.

26. A method of editing moving picture according to claim 22, further comprising a step of reading out said related information from said data areas of said memory based on an instruction and outputting the read-out related information to said display unit.

27. A method of editing moving picture according to claim 17, further comprising a step of detecting a frame image containing specific feature information and a step of relating the inputted related information with the frame image containing said feature information.

28. A method of editing moving picture according to claim 27, further comprising searching for the frame images and the related information stored in said memory and extracting the frame image containing said specific feature information therefrom.

29. A method of editing moving picture according to claim 17, further comprising a step of displaying a related information icon for specification of said related information and a step for placing said related information icon on said representative still image with use of an input device to correspond the related information input from said input device to said representative still image.

30. A method of editing moving picture according to claim 29, wherein said related information is multimedia information.

31. A method of editing moving picture according to claim 29, further comprising a step of displaying the representative still image associated with said related information as discriminatable from the other images.

32. A method of editing moving picture according to claim 17, further comprising a step of displaying on a display unit the representative still image of said moving picture, a step of selecting the representative still image displayed on said display unit, and a step of editing the moving picture by positioning in said hierarchical structure one of the displayed representative still images selected by said input device.

33. A computer program product stored on a computer usable medium for editing moving picture, said computer program when executed causes a computer to perform the steps of:
  inputting said moving picture and related information, said moving picture comprising a plurality of scenes, each scene comprising a plurality of cuts and each cut comprising a plurality of frame images;
  detecting change points of said moving picture and dividing said moving picture into said scenes and cuts;
  extracting a still image representing each of said scenes and cuts;
  storing said related information and the representative still images of said scenes and cuts in a memory,
  wherein said related information includes information concerning properties of a person associated with said scenes, cuts, frames and still images;
  designating said representative still images of said scenes and cuts to edit said moving picture;
  determining a hierarchical structure, said hierarchical structure comprising a plurality of layers in accordance with said scenes and cuts;
  displaying said hierarchical structure of said representative still images and said related information so that said related information in relation to said representative still images to be displayed is displayed with said representative still images.

\* \* \* \* \*